United States Patent [19]

Mojden et al.

[11] Patent Number: 4,537,010
[45] Date of Patent: Aug. 27, 1985

[54] PALLETIZING SYSTEM

[75] Inventors: Wallace W. Mojden, Hinsdale; Robert E. Darr, Chicago, both of Ill.

[73] Assignee: Fleetwood Systems, Inc., Countryside, Ill.

[21] Appl. No.: 459,978

[22] Filed: Jan. 21, 1983

[51] Int. Cl.³ ............................................. B65B 35/50
[52] U.S. Cl. ........................................ 53/447; 53/469; 53/535; 53/537; 53/540; 53/571
[58] Field of Search ....................... 414/63, 85; 53/149, 53/247, 443, 447, 469, 535, 537, 540, 571, 591

[56] References Cited

U.S. PATENT DOCUMENTS 2,470,795  5/1949  Socke ..................................... 53/149
2,813,638 11/1957  Miller .................................... 53/535
3,878,945  4/1975  Mojden et al. ....................... 414/107

Primary Examiner—Francis S. Husar
Assistant Examiner—Jorji M. Griffin
Attorney, Agent, or Firm—Trexler, Bushnell & Wolters, Ltd.

[57] ABSTRACT

There is disclosed a method and apparatus for the automatic handling and bagging of articles, such as can ends, and thereafter depositing filled bags of said article on a pallet member in such a manner as to provide a plurality of layers of filled, palletized bags. The apparatus includes a receiving station which can handle a continuous flow of articles and provide individual stacks of articles disposed in facewise relationship for delivery to a bagging station. At the bagging station the stack of articles is automatically disposed with a bag to provide a filled bag. A collating station is provided which receives the filled bags from the bagging station and temporarily stores a layer of a number of filled bags in generally side-by-side horizontal disposition prior to palletizing. The collating station includes a discharger for depositing a layer of filled bags onto a palletizing station. At the palletizing station a pallet member is received preparatory to the disposition of one or more layers of filled bags thereon and strips of tape may be interweaved between the layers of bags.

35 Claims, 16 Drawing Figures

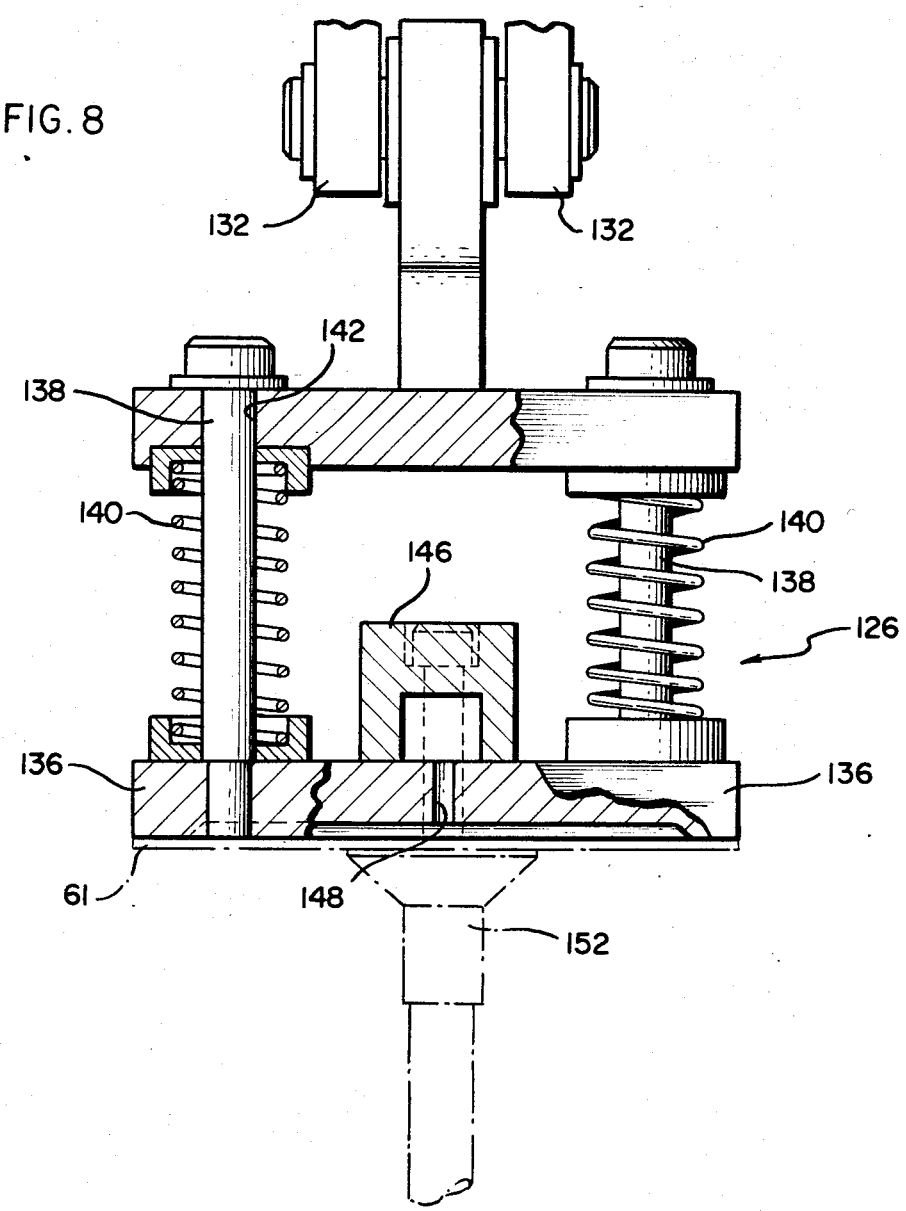
FIG. 8
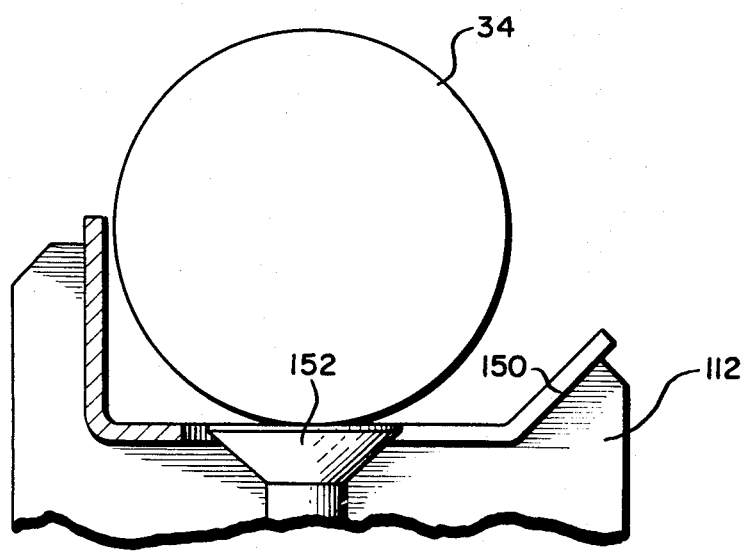

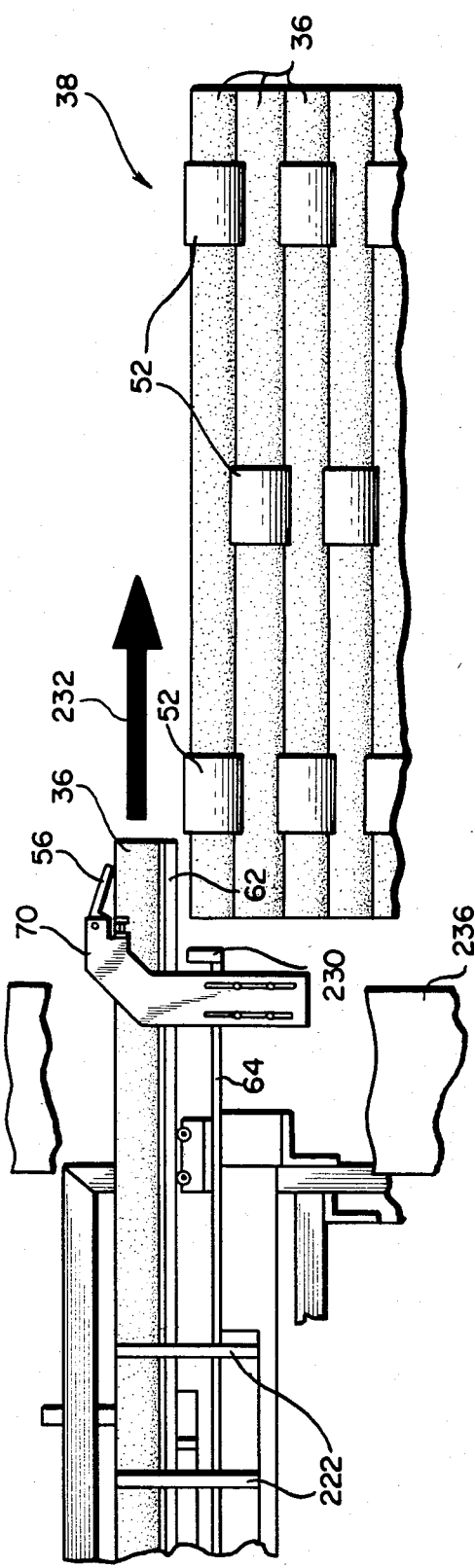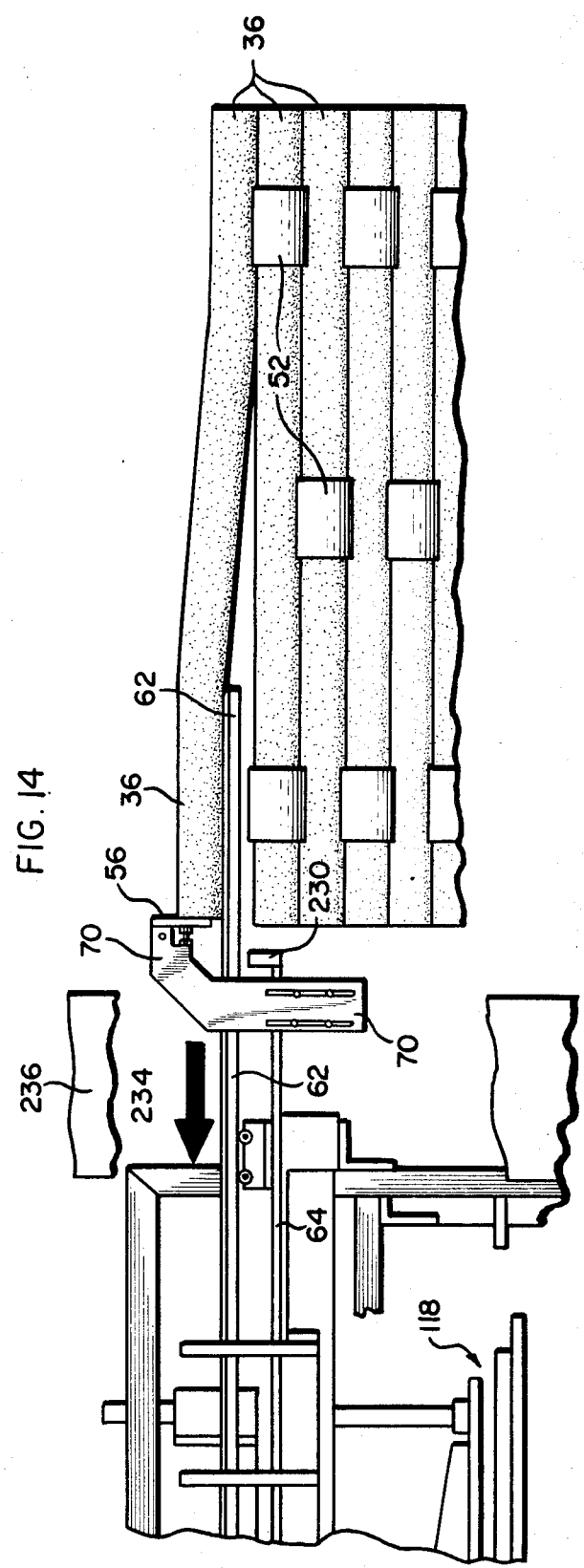

4,537,010

PALLETIZING SYSTEM

BACKGROUND OF THE INVENTION

The present invention relates generally to apparatus for handling and packaging can ends, and more specifically to apparatus capable of receiving a continuous flow of manufactured ends, packaging a precounted stack of ends, and thereafter palletizing the individual packages for subsequent transport, all these functions being done automatically.

Most users of can, such as canneries, breweries and soft drink bottlers, do not manufacture the basic can components, which are purchased from manufacturers who specialize in the fabrication of these components. Basically, the purchased components include the can bodies having an open end, and the can ends that are employed to close the bodies subsequent to the filling or canning operation. The can ends are packaged and shipped separately from the can bodies, and the usual practice is to ship the ends in elongate kraft paper bags. The quantity of ends per package varies depending upon the can end diameter, however, by way of example, with regard to typical beverage cans, each filled bag preferably will contain 300 or 360 ends. In order to avoid disruption in the canning or bottling operations it is extremely important that an accurate count of ends be obtained with respect to each package. Not only can an inaccurate count disrupt the canning operation, but when an inaccurate count is detected by the quality control group at the cannery or brewery it is necessary for the manufacturer of the ends to make up the discrepancy, and such "make-up orders" are costly and time consuming.

The problems and need for providing apparatus whereby can ends can be packaged with an accurate count have been long recognized in the art. In this regard, attention is invited to U.S. Pat. No. 3,878,945, issued Apr. 22, 1975 to Fleetwood Systems, Inc., the Applicant company herein. This patent discusses in detail the then prior art problems, which discussion is incorporated herein by reference. In addition, this patent illustrates and discloses apparatus capable of handling a continuous flow or stream of manufactured ends; separating this stream of ends into an accurately counted stack with the ends in facewise engagement; and then delivering the counted stack to a bagging station wherein either manual or automatic bagging may be effected.

The apparatus as illustrated and disclosed in the above mentioned patent has proven itself over the years to be a reliable and efficient means for handling the can ends and providing filled packages with an accurate count of ends. Even with the semiautomatic and automatic counting and bagging apparatus as disclosed in this patent, however, it is still necessary for the operator to palletize the filled bags manually in preparation for shipment to the ultimate user. The present invention, as will be discussed in greater detail hereinafter, utilizes the basic concepts of the above mentioned patent with regard to the handling, counting, separation and bagging of the ends, while improving upon the bagging operation, and further provides apparatus whereby the filled bags are automatically palletized. In addition to the automatic palletization of the bags, the apparatus of the invention is capable of effecting an interweaving of strips of binding tape between the respective layers of filled, palletized bags in such a manner as to retain the individual bags in the palletized position during transport.

SUMMARY OF THE PRESENT INVENTION

Briefly, the apparatus and method of the present invention provides means for handling and bagging articles such as can ends, and thereafter positioning the filled bags on a pallet member in such a manner as to provide a plurality of layers of filled, palletized bags. The term "stacked" as used herein and throughout the specification and claims applies to can ends or articles in abutting facewise engagement, whether disposed horizontally or vertically. Accordingly with the apparatus of the present invention, a continuous stream of stacked ends enter a receiving station wherein the ends are separated into individual stacks with each stack including a predetermined count of ends or articles. The counted stack of articles is then transported to a bagging station wherein fold bag members are automatically removed from a magazine, the mouth of the bag is opened and the counted stack of articles or ends is disposed therein. From the bagging station, the filled bags are delivered to a collating station wherein they are temporarily stored in side-by-side horizontal relationship until a predetermined number of filled bags have been received; said predetermined number of filled bags serving to define a layer of bags once palletized. Further, in accordance with the invention, the layer of bags to be palletized is transported from the collating station onto a pallet member automatically and without operator assistance. As an additonal feature, the invention employs tape dispensing means for interweaving a plurality of strips of tape between the respective layers of filled bags in order to maintain the layers in the palletized relationship during subsequent transport.

DESCRIPTION OF THE DRAWINGS

A better understanding of the invention, its organization and operation may be had by reference to the following detailed description taken in conjunction with the accompanying drawings wherein:

FIGS. 1-3 serve to provide an elevational view of the apparatus of the present invention, wherein FIG. 1 illustrates the receiving station wherein the ends are separated into counted stacks, FIG. 2 is a continuation of the apparatus of FIG. 1 illustrating primarily the bagging station, and FIG. 3 is a further continuation of said apparatus providing an elevational view of the palletizing station and tape dispensing means;

FIG. 8 is an elarged, detailed view of a vacuum head used to remove a bag from the bag magazine;

FIGS. 13 and 14 are similar, partial elevational views of the collating and palletizing stations, illustrating preferred apparatus for discharging bags onto the palletizing station;

DETAILED DESCRIPTION OF THE ILLUSTRATED EMBODIMENT

Initially, an overall discussion will be had with respect to the apparatus of the present invention and its method of operation, said discussion being directed primarily to FIGS. 1–4. This initial discussion will refer in part to the above mentioned U.S. Pat. No. 3,878,945, the teachings of which are specifically incorporated herein by reference as part of the present disclosure. Thereafter, the various stations and components of the apparatus of the invention will be discussed in detail, with primary emphasis being placed upon the collating and palletizing stations.

Figure 1:
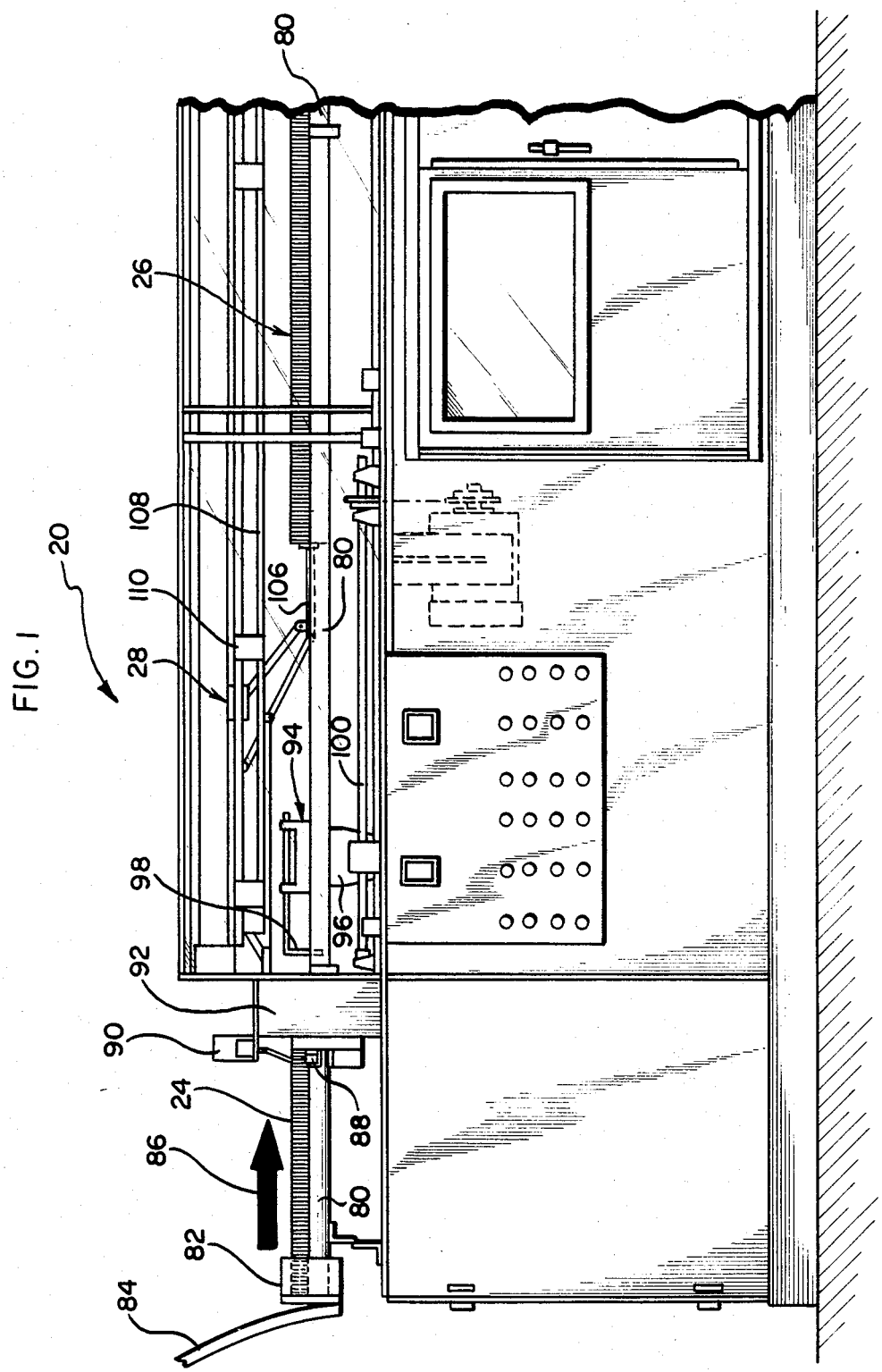
Figure 2:
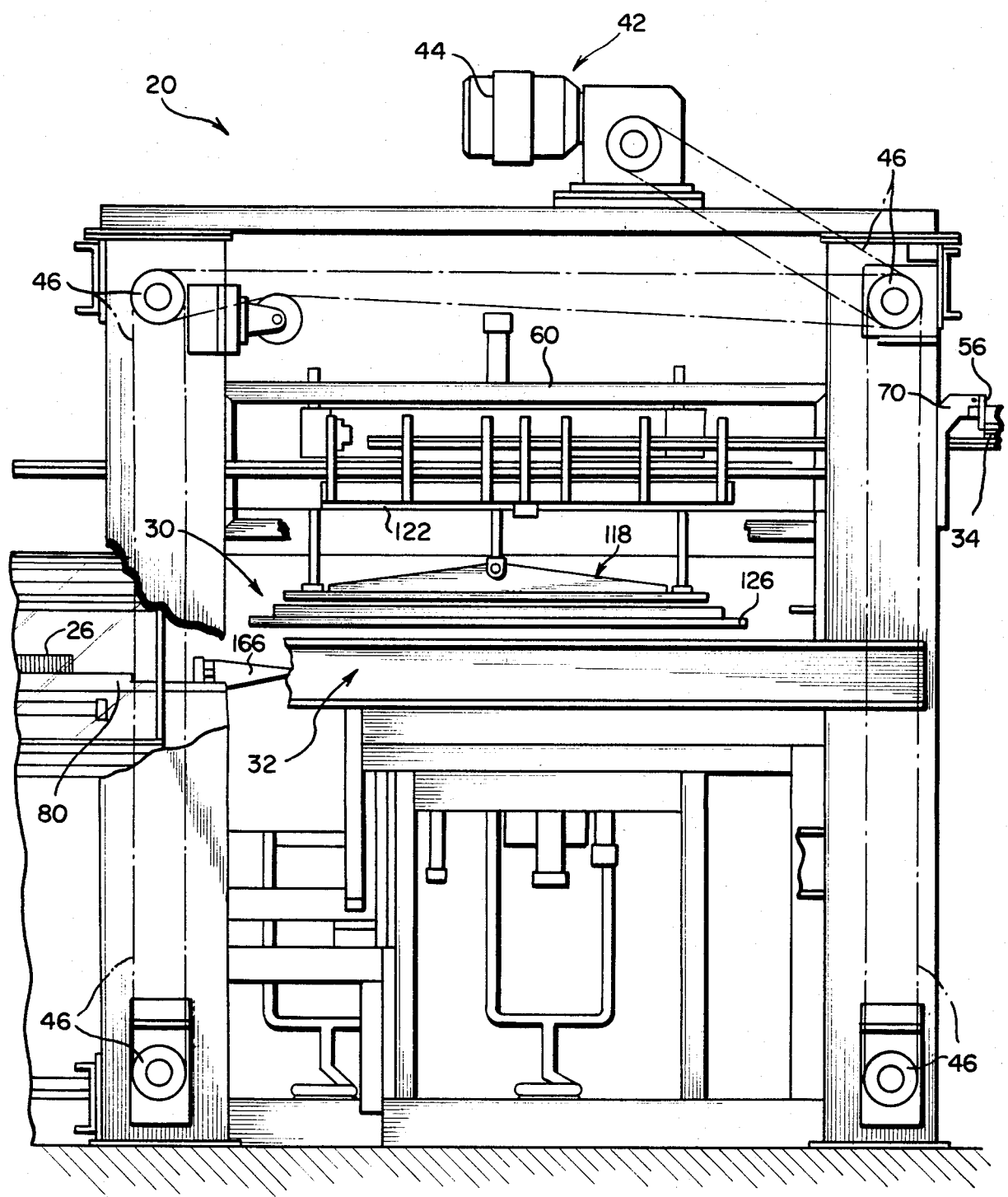
Figure 3:
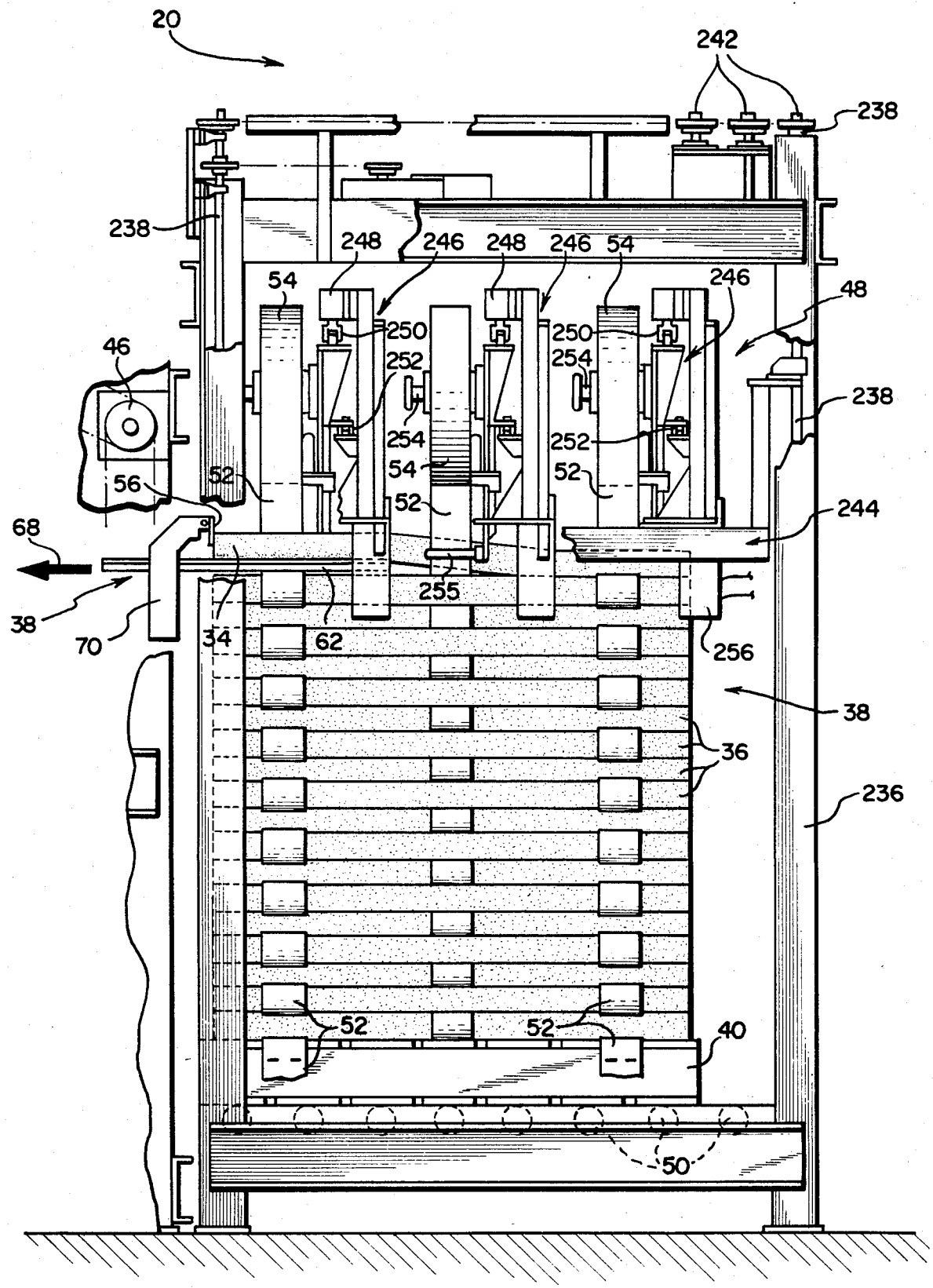

Accordingly, attention is initially invited to FIGS. 1–3 which are component views that together provide an elevational view of the overall apparatus, which is designated generally 20. Basically, the apparatus 20 includes a receiving station 22 to which is delivered a continuous stream of manufactured ends 24. At the receiving station, the ends 24 are counted and separated into stacks 26 of ends in facewise engagement, with a predetermined number of ends in each of said stacks. Once a counted stack 26 of ends is separated from the continuous stream of ends 24 entering the receiving station, transport means 28 is employed to deliver the stack 26 to the bagging station, which is designated generally 30, and is shown primarily in FIG. 2. A more detailed discussion of the various components of the apparatus of the receiving station 22 of FIG. 1 will be set forth hereinafter following the general description of the overall apparatus and its method of operation.

Figure 4:
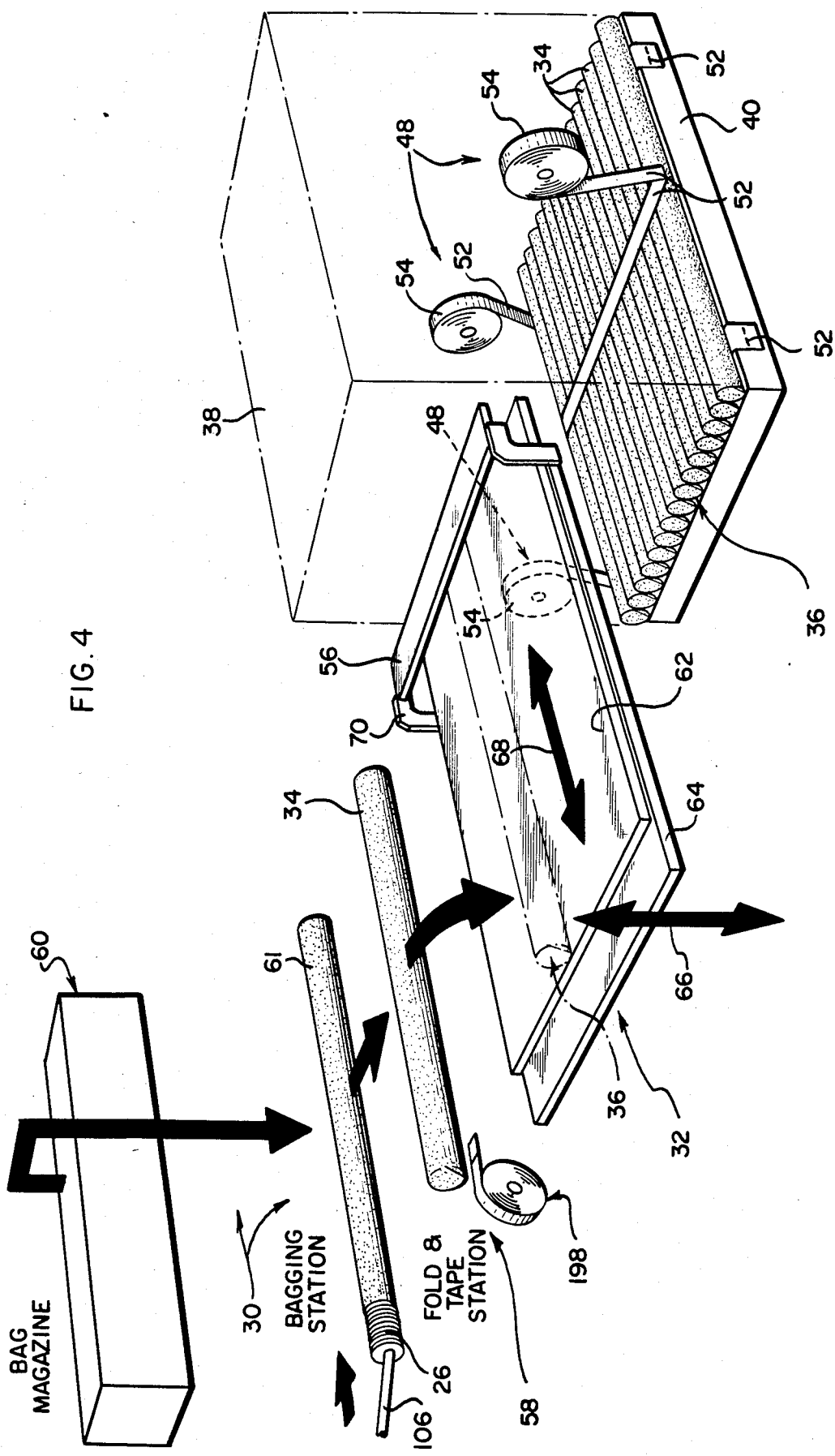
FIG. 4 is a prespective, diagrammatical representation of the operation of the apparatus of the present invention from the bagging station through the palletizing and tape dispensing stations.

FIG. 2 is a continuation of FIG. 1, and essentially illustrates the middle third of the apparatus 20, that is the bagging station 30 and a portion of the collating station, which is designated generally 32. As will be explained, the collating station 32 receives the filled bags 34, see FIG. 4, from the bagging station 30 and accumulates and positions a predetermined number of bags preparatory to palletizing. Once the prescribed number of filled bags 34 is collected at the collating station, that is, a sufficient number of bags 34 to form a layer 36 of the palletized stack of bags, the collating apparatus is operated to deliver the bags to the palletizing station 38. It should be noted that it is necessary to move the collating station 32 vertically in order to align the layer 36 of bags thereon with the uppermost layer of bags 36 on the pallet member 40, as shown in FIGS. 3 and 4. Toward this end, the collating station 32 includes vertical drive means 42 comprised of a motor 44 and a relatively conventional drive arrangement 46 which includes various sprockets and drive chains. The overall operation thereof will be apparent from the description of the apparatus which follows.

The palletizing station 38 is shown in some detail in FIG. 3, and includes, in addition to means for accepting a pallet member 40, tape dispensing means designated generally 48. Looking to FIG. 3, it should be noted that the various layers 36 of bags are disposed upon a pallet member 40 which in turn is supported at the palletizing station on a series of rollers 50. Attached to the pallet 40 are three strips of tape 52, the ends of two of which are visible in FIG. 3, these ends being stapled or otherwise attached directly to the pallet 40. The respective strips of tape 52 are continuous and are dispensed from rolls of tape 54 shown in the upper portion of FIG. 3, which rolls are supported upon elements of the tape dispensing means 48 to be discussed hereinafter.

In the final palletized assembly, the strips of tape 52 serve to maintain the stacked layers 36 in the palletized position during transport. The respective strips of tape 52, as can be seen in FIG. 3 and as will become apparent from the discussion of other figures of the drawings to follow, are interwoven between the respective layers 36 of filled bags with the intermediate strip 52 being disposed generally oppositely of the end strips 52. The net effect, is that the strips 52 serve to support the respective layers in position, and prevent inadvertent depalletizing of the filled bag members 34.

As an additional matter, it should be noted that FIG. 3 is a continuation of FIG. 2, and illustrates a layer 36 of bags being deposited upon the uppermost previously palletized layers. The preferred means for discharging the layer 36 from the collating station 32 to the palletizing station 38 is a stripper bar or plate 56. As can be seen in FIG. 3, the stripper bar 56 is engaged against the end of a layer 36 of bags with the component of the collating station 32 being retracted horizontally to discharge the layer 36. The manner in which the stripper bar 56 and the collating station 32 function in this regard will become clear from the discussion of FIG. 4 to follow.

FIG. 4 is a perspective, diagrammatic view illustrating the operation of the bagging station 30, collating station 32 and the palletizing station 38. Also shown in FIG. 4 is a fold-and-tape station designated generally 58, wherein the open or entry end of the filled bag 34 is folded over, and a strip of tape applied thereto to maintain the bag in the sealed condition. It should be noted that FIG. 4 is diagrammatic in nature, and a more detailed discussion of the components which comprise the various stations illustrated therein will be presented with regard to FIGS. 5–16.

With continued reference to FIG. 4, the bagging station 32 includes a bag magazine 60 wherein a supply of folded bags 61 are stored. In addition, the bagging station includes a bag handling mechanism (not shown in FIG. 4 but to be discussed with regard to FIGS. 7 and 8) which removes the bags 61 from the magazine 60, opens the entry end of the bag, and disposes a counted stack of ends 26 therein to provide a filled bag, which is designated 34. After bagging of the counted stack of ends 26, the filled bag 34 is then transported to the tape-and-fold station 58 wherein the open end of the bag is sealed. From the station 58, the filled bag 34 is then delivered to the collating station 32.

Collating station 32 includes primarily, a platen member 62 and a platen support 64, with the platen 62 carried in overlying superposed relation to the support 64. The support 64 and the platen 62 are jointly moveable in the vertical direction, as indicated by arrow 66, with the platen 62 also being moveable horizontally relative to the support 64, which mode of movement is indicated by the arrow 68. Accordingly, as the filled bags are ejected from the fold-and-tape station 58, they will be received on the upper surface of the platen 62. The collating station 32 includes means (not shown in FIG. 4, but illustrated and to be discussed with regard to FIGS. 11 and 12) wherein the filled bags are moved laterally across the platen until a series of filled bags 34 are stored in side-by side horizontal relationship on the upper surface of the platen 62. This series of filled bags 34 is stored only temporarily on the platen 62, and will serve to define a layer of bags 36 once palletized.

The collating station 32 also includes means for discharging a layer 36 of filled bags 34 from the platen 62 and depositing this layer 36 at the palletizing station 38. In a preferred form of the invention, the platen support 64 includes a pair of upright arms 70 to which is pivotally mounted a stripper plate 56, mentioned previously with regard to FIG. 3. The stripper plate 56 is mounted so that it can pivot in a generally counterclockwise direction, as shown in FIG. 4, from its usual vertical position. The stripper bar 56 is, however, restrained against pivoting in the opposite, clockwise direction for a purpose which will become clear from the discussion of the general operation which follows.

In operation, once a layer 36 of filled bags 34 has accumulated on the platen 62, the overall control mechanism for the machine 20 will move the platen support 64 and correspondingly the platen 62 vertically in order to align the platen 62 with the uppermost layer 36 of filled bags at the palletizing station 38. The vertical movement in this regard is illustrated diagrammatically by the arrow 66 in FIG. 4, and is controlled by a conventional sensor means (not shown in FIG. 4) which senses the height of the layers 36 on the pallet 40 and controls the vertical drive mechanism 42, FIG. 2, to attain the aforementioned alignment. Once the platen 62 is properly aligned, the horizontal drive mechanism for moving the platen 62 relative to the support 64 is operated, which causes the platen 62 to move horizontally to the right as viewed in FIG. 4. This movement will continue until the platen 62 is disposed in overlying, superposed relationship with respect to the uppermost layer of filled bags 36 on the pallet member 40. As the platen 62 moves horizontally, the layer 36 of filled bags 34 thereon will engage the stripper bar 56, causing the stripper bar to pivot upwardly to the position as illustrated in FIG. 4. This movement of the stripper bar permits the filled bags 34 and platen 62 to pass beneath the bar 56 into overlying relationship with the palletizing station 38. This condition is also illustrated in FIG. 13.

Once the layer of filled bags 34 on the platen 62 have passed under the stripper bar 56, the bar will pivot from the horizontal position of FIG. 4, to its normal, generally vertical position as illustrated in FIGS. 3 and 14, with said stripper bar 56 now being positioned behind the layer of filled bags 34, but slightly above the upper surface of platen 62. When this condition is reached, the platen 62 and the layer 36 of filled bags 34 thereon will be superposed in overlying relation with respect to the uppermost layer 36 of bags on the pallet 40. Next, the platen 62 is retracted. Due to the positioning of the stripper bar 56 behind the filled bags, and the fact that this bar is restrained against pivoting in a clockwise direction, as the platen is retracted the layer 36 will be discharged from the platen 62 and deposited upon the layer 36 of previously palletized bags. Again, this condition wherein the bags are being discharged upon withdrawal of the platen 62 can be viewed in FIG. 3 or FIG. 14.

Continuing with reference to FIG. 4, once the layer 36 of filled bags 34 is deposited at the palletizing station 38, the tape dispensing mechanism 48 is operated. The tape dispensing mechanism 48 is illustrated diagrammatically in FIG. 4 by three rolls of tape 54, wherein a continuous strip of tape 52 is played off of each roll. The rolls are arranged, such that the two end rolls are positioned oppositely of the intermediate roll. Once the layer 36 is deposited at the station 38, the rolls 54 are caused to transverse the palletizing station 38, the end rolls moving to the right as viewed and the intermediate roll to the left. The effect of this operation is to interweave a continuous strip of tape 52 from the rolls 54 between the various layers 36 of filled bags on the pallet 40.

Now that the general operation of the machine 20 has been discussed briefly, the construction and operation of the various components thereof will be reviewed in greater detail. In this regard, attention is initially directed back to FIG. 1 which it will be recalled illustrates the forward portion of the machine 20, and more specifically the receiving station 22. Further, it should be noted that the receiving station 22 is constructed generally in accordance with the concepts and disclosures of U.S. Pat. No. 3,878,945, the teachings of which are incorporated herein by reference. As this aspect of the machine forms only a component of the present invention and is fully disclosed in the above mentioned patent, the overall construction and operation will be discussed only briefly.

The receiving station 22 includes a trough 80 which extends along the entire portion of the receiving station 22, as shown in FIG. 1. A continuous flow of manufactured ends 24 are delivered to the entry end of trough 80 in stacked facewise relation by means of a vacuum stacker 82 of the type shown in the aforementioned patent. In this regard, the ends are received by the vacuum stacker 82 in a spaced, flat disposition from a guide 84 extending from the can end manufacturing apparatus (not shown). Whatever type of mechanism that is employed to deliver the stream of ends 24 to the trough 80, said mechanism propels ends along the trough as indicated by the arrow 86. The movement of the ends 24 along trough 80 will cause the ends to engage a pair of opposed rollers 88 of a counting mechanism 90 which provides a count of the ends 24 passing said rollers 88. Adjacent the counting mechanism 90 there is provided a plenum chamber 92 through which air is withdrawn. This withdrawal of air in effect serves to create a vacuum which will cause the ends 24 to exit the rollers 88 at a faster rate than which said ends 24 are delivered to said rollers 88. Thus, a gap is created in the stream of can ends 24 moving in the trough 80 proximate the interior of the plenum chamber 92. In addition, the plenum chamber 92 includes restacking means (not shown) which restacks the end downstream of the gap and the rollers 88.

Adjacent to plenum chamber 92, there is positioned a separator mechanism 94 which includes a carriage 96 that is moveable horizontally and parallel to the trough 80. The separator mechanism 94 includes a pivoted arm 98 moveable between the position shown and an elevated position above the trough. As shown in FIG. 1, the carriage 94 and arm 98 are in an intermediate position. The initial position for the carriage 94 would be adjacent to plenum chamber 92 with the pivoted arm 98 disposed within said plenum chamber 92 and pivoted upwardly out of the trough 80 in alignment with the gap being created in the stream of can ends 24. Accordingly, with the counter 90 detecting the passage of can ends past the rollers 88, once the desire count is reached, the arm 98 will be pivoted downwardly into the trough 80 thereby serving to isolate a counted stack of ends designated 26. In conjunction with the pivoting of the arm 98 to isolate a counted stack of ends 26, the carriage 94 is operated and guided along a rail 100, said carriage being propelled by a conventional drive mechanism 102. Operation of the carriage 94 will move a counted stack of ends 26 longitudinally along the trough 80 approximately to the position as shown in FIG. 1. Once this is done, the arm 98 pivots upwardly and the carriage returns to its initial position adjacent to plenum chamber 92 to reposition the arm 98 interiorly of the chamber for engagement with the next stack of ends to be counted.

Upon retraction of the carriage 94, the primary transport mechanism designated generally 28 is operated. The transport mechanism 28 includes a pusher bar 106 which is engaged against the stack of can ends. The transport mechanism 28 includes carriage means which moves along an elongate rod 108, and is propelled by a conventional drive arrangement 110 similar to that used for the carriage means 94 mentioned previously. The operation of transport mechanism 28, thus moves the counted stack of can ends longitudinally of the trough 80 toward the bagging station 30.

It should be noted, that a detailed illustration and discussion of the various components of the receiving station 22 has been omitted for purposes of clarity, as the receiving station 22 is constructed essentially in accordance with the concept and disclosure of the aforementioned U.S. Pat. No. 3,878,945. If a more detailed consideration of this structure is deemed necessary, reference should be made to said patent.

The bagging station 30 will now be considered in conjunction with FIG. 2, as well as FIGS. 5-9. Here again, a number of the concepts employed correspond to those as disclosed in the previously mentioned United States Patent.

Concerning the bagging station 30, the station includes apparatus for handling a folded bag member 61, thereafter opening the entry end of the bag and then positioning the bag for disposition of a counted stack of ends 26 therein. Attention will be directed initially to the means for storing and handling the bags 61 in conjunction with the bag magazine 60 mentioned with respect to FIG. 4. The mechanism to be discussed is disclosed partially in FIG. 2 but can be seen in greater detail in FIGS. 7 and 8.

Figure 6:
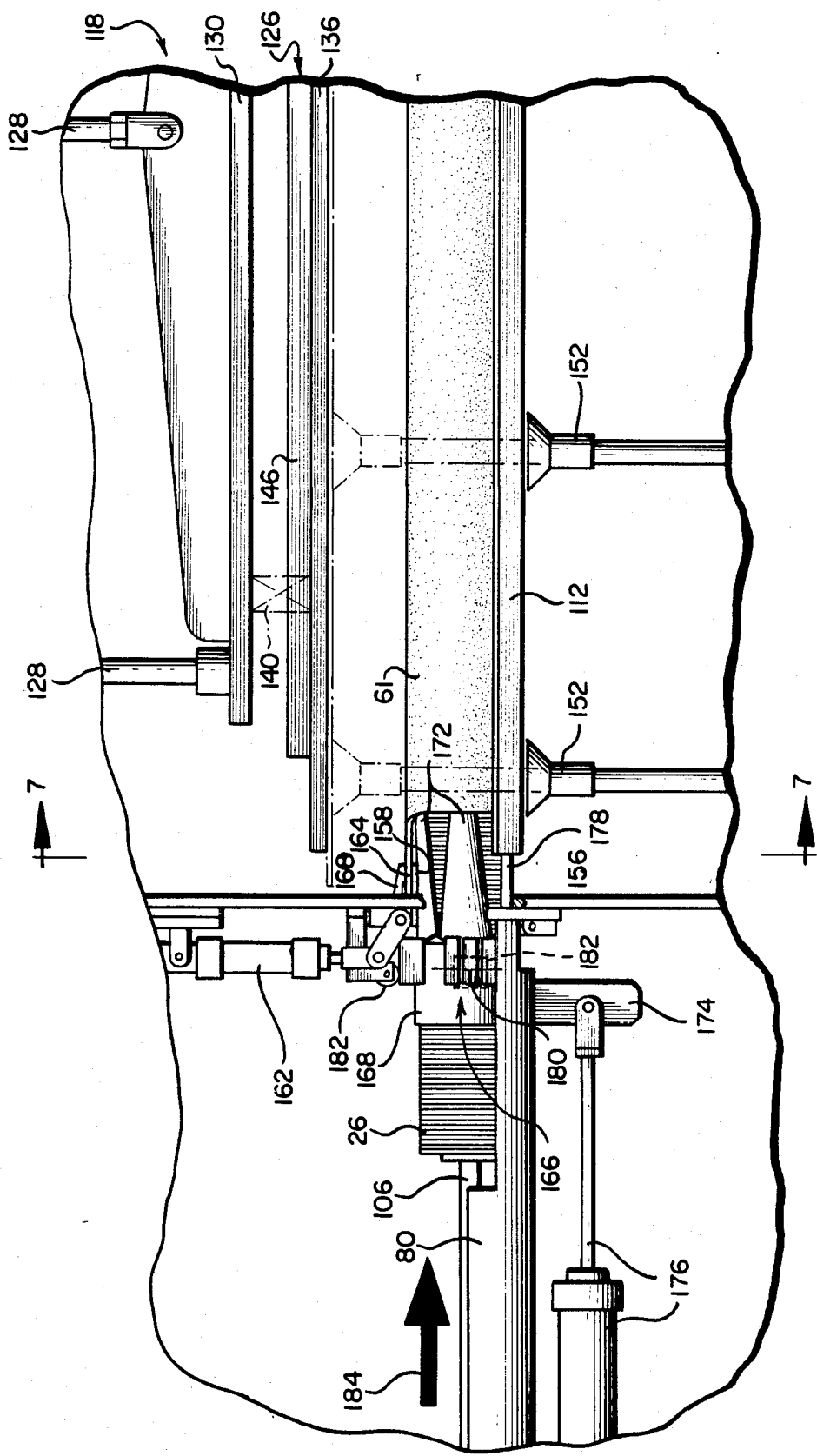
FIG. 6 is a view similar to FIG. 5 but with the horn inserted within the bag, and a stack of counted ends being disposed in the bag through the hollow horn member.
Figure 7:
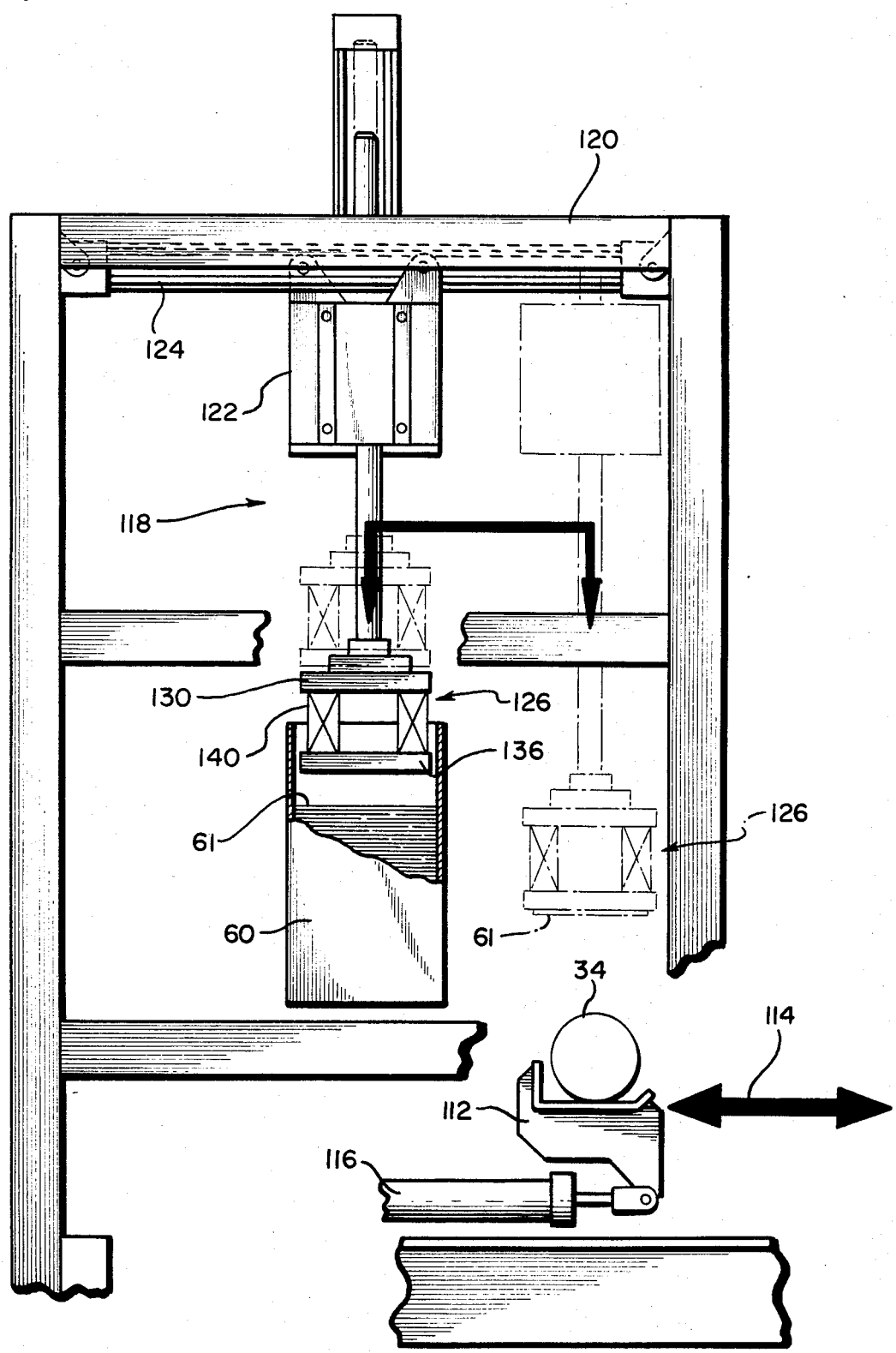
FIG. 7 is an elevational view of the improved bag handling mechanism of the present invention taken generally along the lines 7—7 of FIG. 6.

Looking first to FIG. 7, the magazine 60 is shown with a supply of folded bags 61 therein. Also shown in FIG. 7 is a tray 112 upon which a filled bag 34 is positioned. Tray 112 is moveable horizontally as indicated by arrow 114 by means of a piston and cylinder arrangement 116. A vacuum shuttle apparatus, designated generally 118, is employed to transport a bag 61 from the magazine 60 into position with respect to the tray 112 (FIGS. 5 and 6), wherein a counted stack of ends 26 will be disposed within the bag.

With respect to the vacuum shuttle apparatus 118, this apparatus is mounted to an upper horizontal section 120 of the overall frame of the machine 20. As can be seen in FIG. 7, there is provided a carrier 122 mounted to a guide rail 124, the carrier 122 being moveable by conventional drive means (not shown) between the positions illustrated wherein it may be aligned with the magazine 60, or alternately, with the tray 112. The vacuum shuttle apparatus 118 includes primarily a vacuum head 126 that is mounted to the carrier 122 by an extendable and retractable arm 128. The specific construction of the vacuum head 126 will be discussed with regard to FIG. 8, however the general operation of the vacuum shuttle apparatus 118 will first be considered.

In preparation for reception of the stack of can ends 26 at the bagging station, the vacuum shuttle 118 is moved to the position illustrated in full line in FIG. 7. The support rod 128 is extended to bring the vacuum head 126 into engagement with the stack of folded bags 61 and the magazine 60. The evacuation of air from the vacuum head 126 will draw a bag 61 into engagement with said head, and upon retraction of the arm 128, the bag 61 will be removed from the magazine 60. Next, the carrier 122 is moved from the position shown in full line in FIG. 7 to that as shown in dotted outline along the guide rail 124. The carrier is moved into alignment with the tray 112, and the arm 128 is extended to bring the vacuum head 126 into position above the tray 112 preparatory to the procedure for opening the bag which will be discussed hereinafter.

Directing attention to FIG. 8, the construction of the vacuum head 126 is shown in greater detail. In this regard, the vacuum head 126 includes a base plate 130 which is mounted to a bifurcated end 132 of the extendable and retractable rod 128 (not shown) by a flange 134. A vacuum plate 136 is resiliently mounted to the base plate 130 by means of studs 138 and spring members 140. The studs 138 extend through apertures 142 in the base plate 130 thereby permitting the vacuum plate 136 to move relative to said base plate to adjust to the level of bags 61 in the magazine 60. The vacuum plate 136 includes an elongate relatively wide recess 144 that runs substantially the length of the plate which length approximate the overall length of the folded bag 61, which is shown engaged against the lower surface of the vacuum plate 136. The vacuum plate 136 includes a manifold member 146 through which air is evacuated, the manifold member 146 communicating with the recess 144 by means of a series of ports 148 formed in the base member 136. The evacuation of air from recess 144 serves to maintain the bag 61 in engagement with the plate 136.

The manner by which the bag is subsequently handled after being removed from the magazine 60 by the vacuum head 126, will now be considered taking into account FIGS. 5, 6 and 8. In this regard, as can be seen in FIG. 8, the tray 112 includes one or more ports 150, with a series of vacuum suction cup members 152 disposed beneath these ports. Accordingly, after the vacuum head 126 has moved a bag 61 into position above the tray, the vacuum suction cup members 152 are extended upwardly, as shown in dotted outline in FIGS. 5 and 6, to engage the folded bag 61. At this point in the operation, air is no longer evacuated through the manifold 146, such that when the vacuum suction cup members 152 are retracted, they will pull the bag 61 downwardly toward the tray 112.

Figure 5:
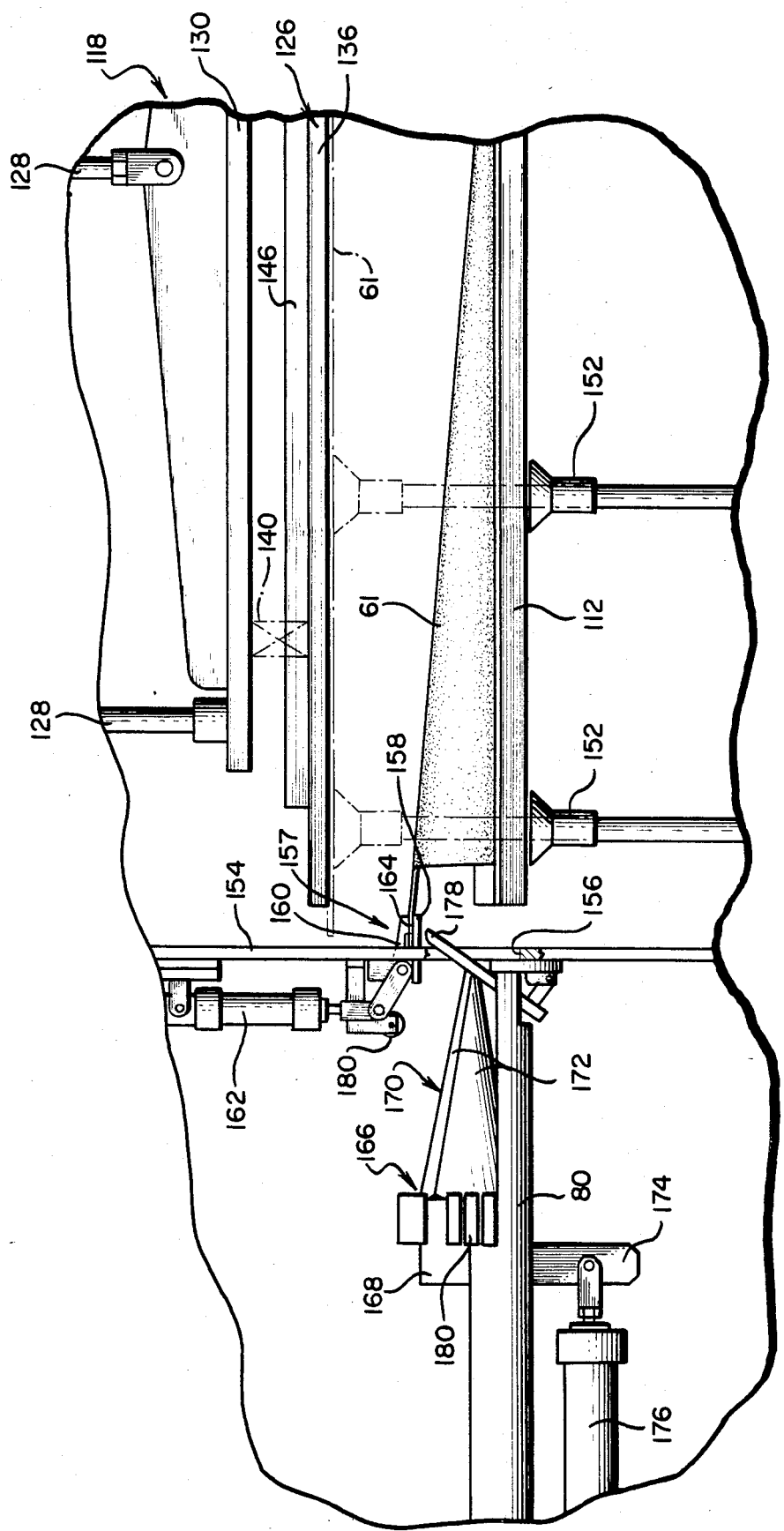
FIG. 5 is an enlarged, partial elevational view of the forward portion of the bagging station, showing a bag held in the open position preparatory to the insertion of a filling horn member within the open mouth of the bag.

The manner in which the entry into the bag 61 is opened will now be considered with specific reference to FIGS. 5 and 6. In this regard, it should be noted that FIGS. 5 and 6 also illustrate a novel horn arrangement which is used to maintain the bag in an open condition during insertion of a counted stack of ends. More specifically, the frame for the machine 20, in the area of the bagging station 30, includes a vertical portion 154, FIG. 5, having a through opening 156 formed therein. Immediately above the opening 156, there is provided a bag clamping arrangement 157 comprised of a lip 158 and a clamping member 160 that is operated through an air cylinder and a linkage arrangement designated generally 162 which can operate the clamping member 160 between the position illustrated in FIG. 5 and a generally vertical orientation.

Accordingly, as the bag 61 is moved downwardly by the vacuum suction cups 152, a tab portion 164 on the entry end of the bag will engage upon the lip 158. The continued movement of the vacuum suction cups 152, will open the entry end of the bag, with the clamp 160 retaining the tab portion 164, thereby opening the entry end of the bag 61, as shown in FIG. 5.

To the left of the frame section 154, as viewed in FIG. 5, there is disclosed a hollow horn arrangement, designated generally 166. As can be appreciated from comparing FIGS. 5 and 6, the horn is moved longitudinally to the right as viewed along the trough 80 and is disposed within the entry end of the bag. The horn 166 is hollow and thus the counted stack of ends 26 can pass through the horn interiorly of the bag 61.

With respect to the horn arrangement 166, said horn includes an annular, hollow base member 168 and a nose portion 170. The nose portion is defined by a plurality, preferably three, pivotally mounted spring biased fingers 172 which in the condition as shown in FIG. 5, provide a substantially conical configuration for said nose portion 170. The base member 168 includes an extension 174 which is connected to a piston and air cylinder arrangement 176 that can effect movement of the horn relative to the trough 80. It should also be noted, that disposed proximate the vertical frame section 154 and partially within the aperture 156, is a pivotally mounted plate member 178 that also serves to maintain the entry end of the bag open.

Once the bag is clamped in position as shown in FIG. 5, by the clamping means 157 provided by lip 158 and clamp 160, the horn 166 is advanced longitudinally of the trough 80. As the horn moves forward, the nose portion 170 will initially engage the pivotally mounted plate 178 causing said plate to pivot in a clockwise direction into the tray 112 and effecting a clamping action with respect to the portion of the entry end of the bag opposite the clamped tab 164. As the horn 166 moves forward, cam members 180 associated with each of the pivotally mounted fingers 172 will engage rollers 182 disposed about the periphery of the aperture 156 to spread the finger as shown in FIG. 6. In FIGS. 5 and 6, only one of said rollers is illustrated, however, it should be understood that a roller is provided for each finger 172 which makes up the conical nose portion 170 of the horn. When the horn reaches the position as shown in FIG. 6, the fingers 172 will be in the spread condition which cooperate in conjunction with the various clamping means discussed above to maintain the entry end of the bag 61 in the fully open condition. Thus, the pusher rod 106 of the transport means 28 can then be employed to dispose the counted stack of ends 26 fully within the bag 61, movement of the stack being in the direction as indicated by the arrow 184. The arrangement for handling the bag 61 at the bagging station is similar to that as disclosed in the aforementioned patent. Accordingly, if necessary reference may be had to said patent for a more complete understanding of the operation of the bagging station 30. It is believed, however, that the preceding discussion taken in conjunction with the drawings will be sufficient for one knowledgeable in this art.

Figure 9:
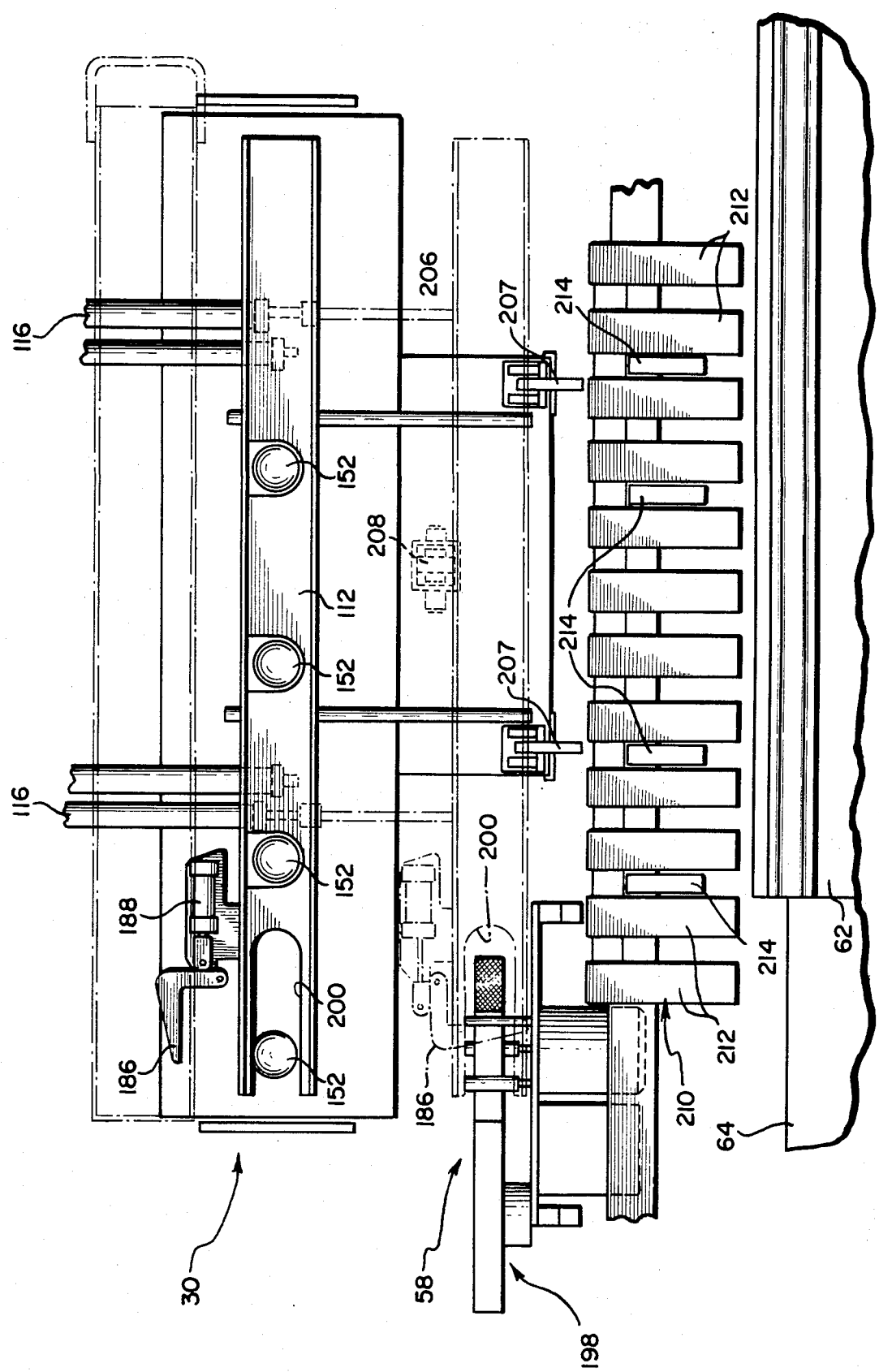
FIG. 9 is a top plan view of the bagging station as well as the fold-and-tape station wherein the open end of the bag is folded over and a strip of tape applied thereto to seal the bag.

Looking now to FIG. 9, there is shown a plan view of the structure of the machine 20 in the area of the bagging station 30 and the tape-and-fold station 58. In this regard, the tray 112 is shown in its full length, and the openings 150 therein which accommodate the vacuum suction cups members 152 can also be seen. Connected to the tray 112 at locations spaced along its length are the piston and air cylinder arrangements 116 which effect the horizontal movement of the tray as indicated by the arrow 114 in FIG. 7. Proximate the forward end of the tray 112 there is disposed a pivotally mounted bell crank type member 186 which is operated by a piston and air cylinder mechanism 188. Once the counted stack of ends 26 is disposed within a bag member 61, the bell crank member 186 is pivoted from the position shown in full line into overlapping engagement with the tray 112. This movement will bring the member 186 into engagement with the open end of the bag to partially close said open end, but primarily to engage the stack of ends 26 therein to prevent any ends from toppling from the bag as the bag is transported from the bagging station to the tape-and-fold station 58, also shown in FIG. 9. In this regard, the piston and air cylinder arrangements 116 will move the tray 112 laterally and horizontally from the full line position to the position as shown in dotted outline wherein said tray 112 is aligned with the fold-and-tape station. As can be seen in the dotted outline of the tray 112, during transport the bell crank member 186 is in its pivoted position overlapping the tray and thus serving to prevent any can ends from falling out of the entry end of the bag member.

Figure 10:
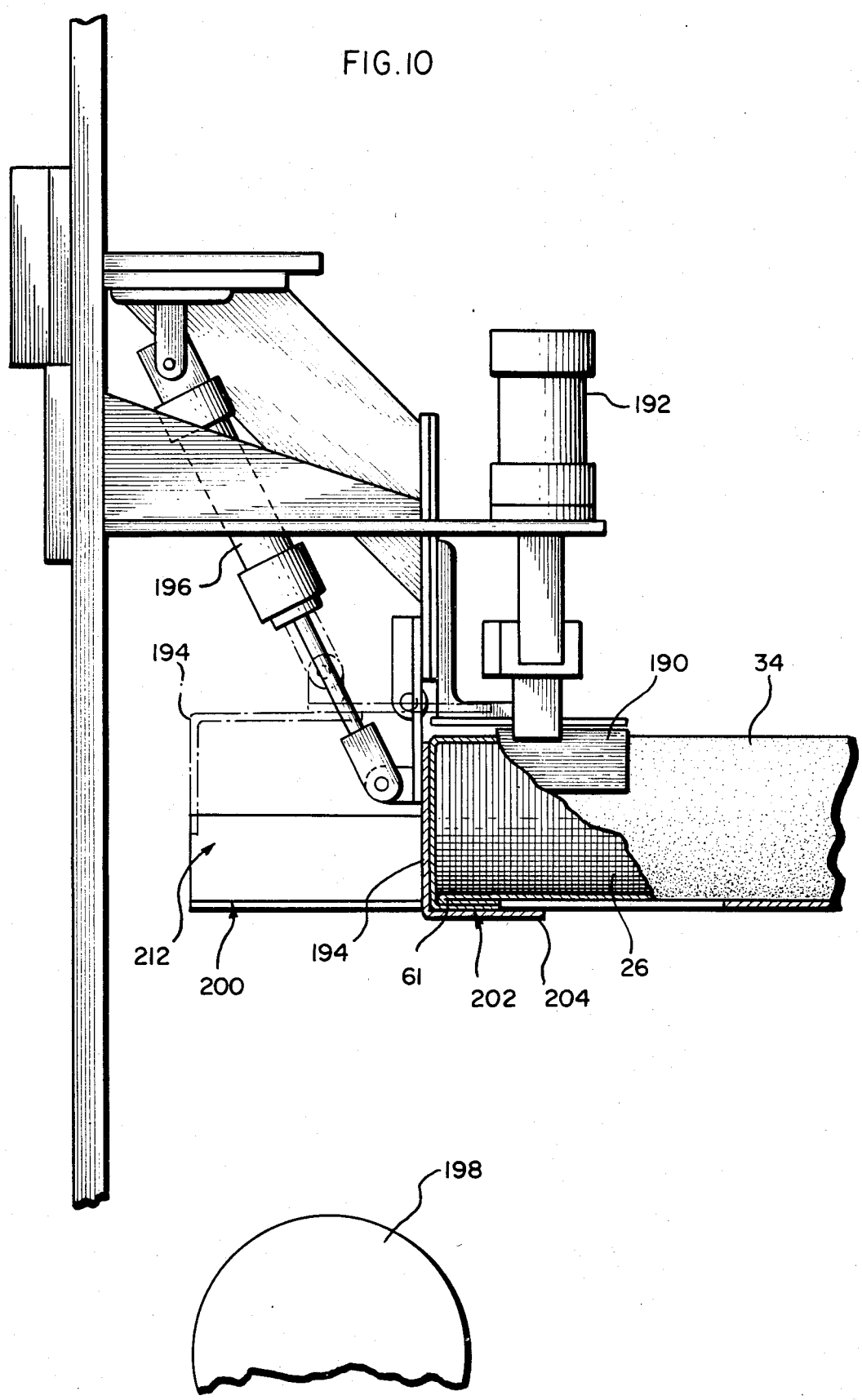
FIG. 10 is a partial elevational view of the fold-and-tape station, the apparatus for applying a strip of tape being shown schematically.

FIG. 10 illustrates the mechanism at the fold-and-tape station 58 for closing the entry end of the bag, and effecting sealing thereof. This apparatus was not included in FIG. 9 for purposes of clarity. In this regard, the fold-and-tape station 58 includes a clamping member 190 which is operated by an air cylinder 192. In addition, there is also provided a pivotally mounted, L-shaped plate member 194 which is moved between the dotted position and the full line position by a pivotally mounted air cylinder 196. Immediately below this arrangement, is the tape applying device which is designated generally 198 and is shown schematically. The specific construction of the tape applying device forms no part of the present invention and it is a purchased unit, one type of which can be obtained from the 3M Company. The unit 198 need only serve to cut and apply a strip of tape from a roll to the folded over entry end of the bag 61.

As an additional matter, it should be noted that the forward end of the tray 112 is grooved or slotted, as indicated at 200 as can be seen in FIG. 9. The groove or slot 200 in effect, exposes the entry end of the bag for engagement by the L-shaped plate 94 and the tape applying means 198. More specifically, the tray 112 will be moved from the bagging station 30 to the tape-and-fold station 58 by means of the air cylinder 116. Upon reaching the tape-and-fold station 58, the piston and cylinder arrangement 192 is operated to bring the clamping member 190 down into engagement with the upper portion of the entry end of the filled bag 34. In conjunction with this operation, the air cylinder 188 is operated to retract the bell crank member 186, and thereafter, the air cylinder 196 is operated to pivot the L-shaped arm 194 from the dotted position as shown in FIG. 10 to the full line position wherein said L-shaped plate will fold over the open end of the bag 61. Next the tape dispensing means 198 is operated to apply a strip of tape to the folded over end thereby sealing the filled bag 34. To facilitate application of the strip of tape, the L-shaped plate 194 includes a slot 202 in the leg portion 204 that engages the underside of the filled bag 34 as shown in FIG. 10. This slot 202 provides an opening whereby the strip of tape may be applied.

Accordingly, after the filled bag has reached the tape-and-fold station 58, the entry end of the bag will be folded over and taped, and the now sealed filled bag 34 is ready for delivery to the collating station 32. The structure for effecting said delivery, is shown in the left hand portion of FIG. 11 and the lower portion of FIG. 9. In this regard, the tray 112, in addition to being moveable horizontally by the cylinder 116, is also pivotally mounted as shown in dotted outline in FIG. 11. Immediately below the tape-and-fold station 58, the apparatus 20 includes a hinged plate 206 which may be operated by an air cylinder device 208. Thus, once the bag 34 is sealed, the air cylinder 208 is operated to cause the plate 206 to pivot into engagement with the tray 112, thereby causing the tray 112 to pivot and discharge the filled bag 34 to a ramp 210. The ramp 210 is provided by a plurality of spaced members 212 and will deliver the filled bag 34 to the platen member 62 of the collating station 32.

Figure 11:
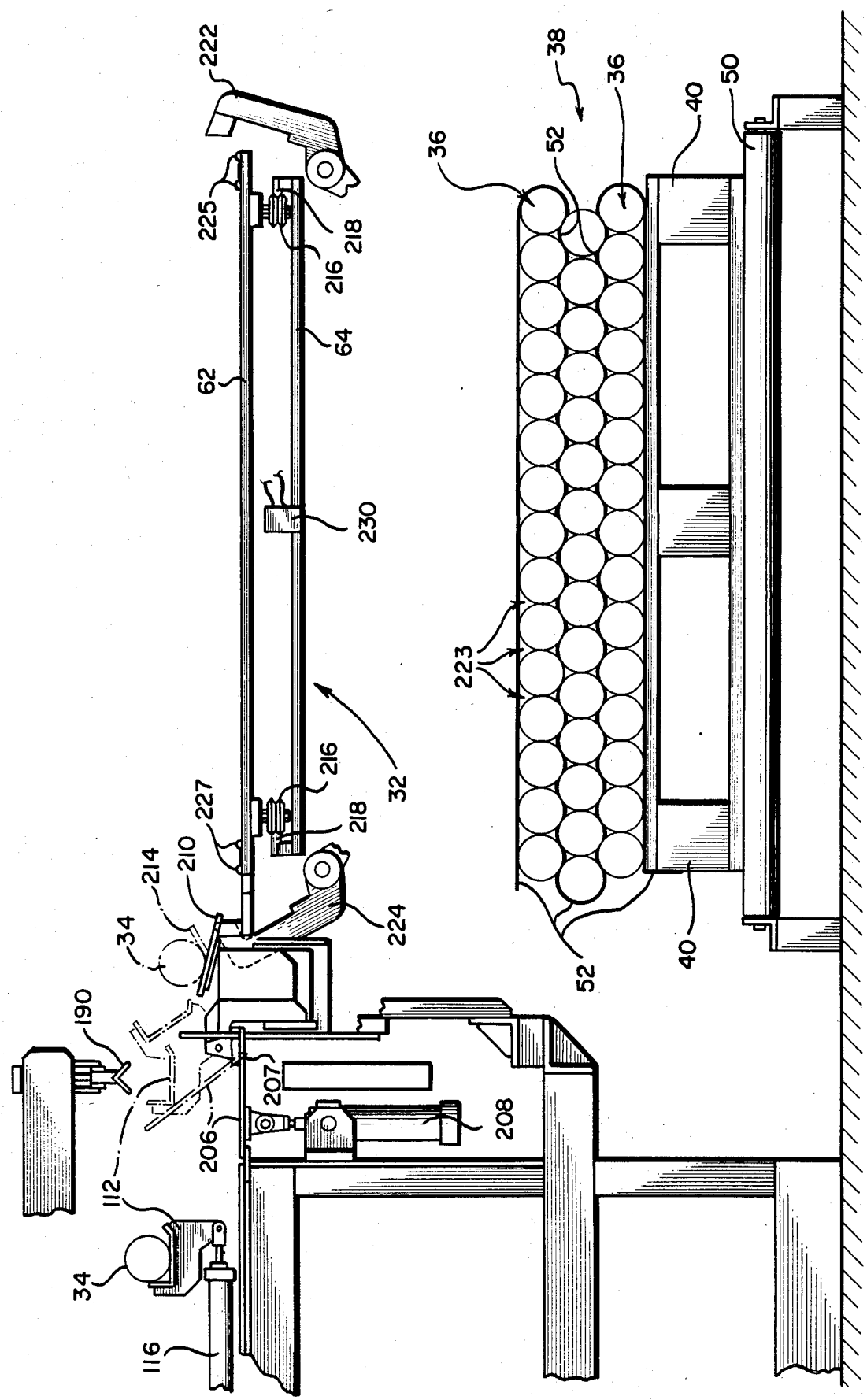
FIG. 11 is an elevational view of the collating station, taken generally at right angles to FIGS. 1–3, and illustrates the means for transporting a filled bag to the fold-and-tape station and for thereafter delivering a filled, sealed bag to the collating station.

It should be noted, however, that a condition may exist wherein the collating station 32 is in operation disposing a layer 36 of bags at the palletizing station 38, when a filled bag is ready for discharge from the tape-and-fold station 58. To accomodate this situation, the machine 20 includes means whereby a filled bag 34 may be retained on the ramp 210 preparatory to completion of the palletizing step and return of the collating apparatus 32 to its filled bag receiving position. In this regard, there is provided in conjunction with the ramp 210, a series of pivotally mounted members 214 which are interposed between certain of the stationary ramp members 212 as can best be seen in FIG. 9. The members 214 can be pivoted to an extended position as shown in FIG. 11, thereby providing a restriction which will maintain a filled bag 34 on the ramp 210 until such time as the collating apparatus 32 is in position for acceptance of the filled bag member 34.

The discussion of the apparatus 20 will not continue with regard to the collating apparatus or station 32, the operation of which was discussed previously in conjunction with FIGS. 1–4. In this regard, it will be recalled that the collating apparatus includes the platen 62 and the platen support means 64, the general construction of which will be considered initially and then the operation of this apparatus will be covered in more detail. The structure of the collating apparatus 32 will be discussed primarily with regard to FIGS. 11 and 12, however, for purposes of clarity, certain components have been purposely omitted in these figures, and occasionally reference will be made to other figures of the drawing wherein these components may be shown. The operation of the collating apparatus will be discussed in conjunction with FIGS. 13, 14 and 15 and with reference to FIG. 4, where necessary.

Figure 12:
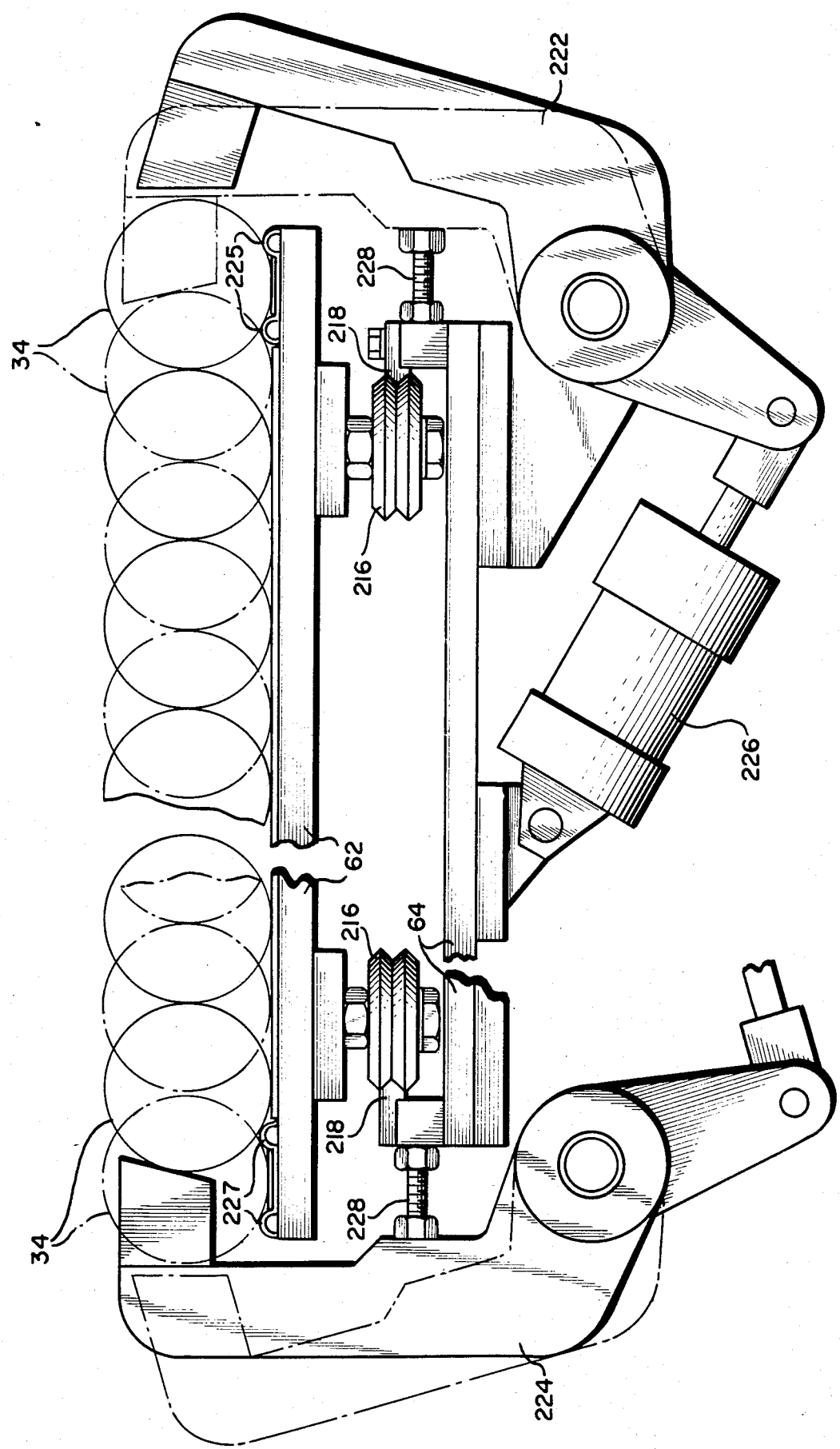
FIG. 12 is a partial, end elevational view of the collating station of FIG. 11 and illustrating means for positioning the respective layers of filled bags to attain an offset relationship upon palletizing of said bags.

It should be recalled that the platen support 64 and the platen 62 are moveable vertically, the drive mechanism 42 for effecting said vertical movement having been previously identified with regard to FIG. 2, that is the drive motor 44 and chain drive 46. The platen 62 is also moveable horizontally relative to the support member 64, and as shown in FIGS. 11 and 12 in order to accommodate this relative horizontal movement, the platen 62 includes a plurality of rollers 216 which are engaged with track members 218 on the support members 64. The rollers and track arrangement 216; 218 will provide for the smooth movement of the platen 62 between its extended position over the palletizing station 38, and its retracted position wherein it is disposed above the platen support 64 and in position for receiving filled bags from the tape-and-fold station 58 as discussed previously. The movement of the platen 62 relative to its support member 64 is effected by an air cylinder 220 which is not shown in FIG. 11, but can be seen in FIG. 15. The upper surface of the platen 62 which receives the filled bags 34 includes a pair of spaced ribs proximate the edges thereof, the first set of ribs designated 225, the second set 227.

Directing attention to FIG. 12, the platen support member 64 includes two opposed sets of pivotally mounted fingers or members, designated respectively 222 and 224, the purpose for these will become apparent from the discussion to follow as to the operation of the collating mechanism 32 in receiving and storing a layer 36 of filled bags 34 thereon. It should be noted, however, that the respective fingers 222 and 224 are pivotally mounted to the platen support members 64 and are moveable between the positions illustrated in FIG. 12 by air cylinder means, with only the air cylinder 226 for the fingers 222 being shown therein. The limit of movement of the respective fingers 222 and 224 is controlled by adjustable stop screws 228 associated with each said set of fingers.

As mentioned above, the collating apparatus 32 receives and temporarily stores a layer of filled bags 34. In this regard, it will be assumed that the platen member 62 is in its fully retracted position preparatory to reception of a layer of bags. As the filled bags 34 are rolled down the ramp 210, they will be deposited on the upper surface of the platen 62. At this time, the set of fingers 224 will be in their retracted position as shown in FIG. 12 and as such will permit the filled bags 34 to pass onto the platen 62. Once a bag 34 reaches the platen 62, the fingers 224 are operated causing them to pivot to the full line position as shown in FIG. 12, wherein the fingers 224 will engage the filled bag 34 and move it laterally across the platen 62 toward the fingers 222. As additional bags are received on the platen 62, the fingers 224 will move the bags sequentially until the initially deposited bag 34 is in engagement with the fingers 222. The disposition of the fingers 224 control the relative position of the bags once a full layer 36 is deposited on the platen 62, and this occurs immediately prior to delivery of the layer 36 of bags to the palletizing station 38. In the full line position as shown in FIG. 12, the initially deposited bag, also in full line, will be disposed between the ribs 225, with the last bag of the layer being adjacent, but not between the ribs 227. With the arm or fingers 224 in the dotted position of FIG. 12, the bags 34, as shown in dotted outline, will be offset by approximately the radius of the filled bag 34, such that the initially received bags 34 will be positioned adjacent, but not between the ribs 225, while the last bag of the layer will be disposed between the ribs 227. The net effect is that through use of the arms 222 the relative position of the bags 34 which make up the individual layers 36 can be controlled from layer to layer, prior to depositing of the respective layers 36 onto the pallet 40.

Control of the relative position of the filled bags 34 in each layer is important to attainment of proper palletization of the various layers 36. In this regard, attention is directed to the lower portion of FIG. 11 wherein two layers 36 of bags are shown on the pallet 40 with a strip of tape 52 interwoven between the respective layers. In this regard, the individual filled bags 34 are substantially circular in section, such that when disposed in side-by-side relationship they serve to define a series of troughs or valleys 223 between the abutting bags. In order to attain proper palletization, it is necessary that the superposed layer 36 be offset with respect to the layer 36 upon which it is supported, in order that the circumference of the filled bags 34 in the upper layer can interfit with the valleys 223 of the underlying layer 36. The pivotally mounted arms 222 are thus used to control the relative disposition of the bags 34 in each layer 36 and to attain the desire offset relationship as illustrated in FIG. 12 upon depositing of the layers 36 of filled bags 34 onto the pallet member 40.

The manner and operation by which the layer 36 of bags 34 is discharged by the collating station 32 to the palletizing station 38 will now be considered. In this regard, once a full layer 36 of bags is received upon the platen 62, the arms 214 associated with the ramp 210 will be pivoted upwardly, as shown in FIG. 11, to prevent any additional filled bags 34 from moving onto the collating station 32 during the discharge operation. Further, once the desired number of bags 34 are received upon the platen 62 the control system for the machine will then energize the vertical drive mechanism 42 for the platen support 64. A sensor 230 carried by the platen support 64 will scan the previously stacked layers 36 of bags at the palletizing station 38 as the platen moves vertically. The sensor 230 will provide an appropriate control signal to de-energize the vertical drive mechanism 42, once the platen 62 is in proper position with respect to the uppermost layer 36 of previously palletized bags 34. Next, the air cylinder 220 for the platen 62 will be energized to move the platen 62 horizontally relative to the platen support 64, as shown in FIG. 4 and FIG. 13. As mentioned previously, the platen support 64 includes a pair of arms 70 adjacent on end thereof to which is pivotally mounted to the stripper bar 56. The platen 62 and the layer 36 of filled bags 34 will move beneath the stripper bar 56 causing the bar to pivot in a generally counterclockwise direction as shown in FIG. 13. Movement of the platen 62 will continue in the direction as indicated by the arrow 232, FIG. 13, until the platen 62 is fully extended and the layer 36 of filled bags are positioned above the palletizing station 38. When this condition is reached, the bags will have cleared the stripper bar 56, and the bar will pivot back to its normal vertical orientation, substantially as shown in FIG. 14.

The platen 62 is then retracted. Due to the position of the stripper bar 56, however, and the fact that it is restrained against pivoting in a clockwise direction, the bar 56 will engage the layer 36 of bags as the platen 62 is retracted in the direction as indicated by the arrow 234, FIG. 14. The net effect, is that the layer 36 of bags 34 is discharged or stripped from the platen 62 and deposited upon the uppermost layer of bags 36 at the palletizing station 38, as shown in FIG. 14.

Figure 15:
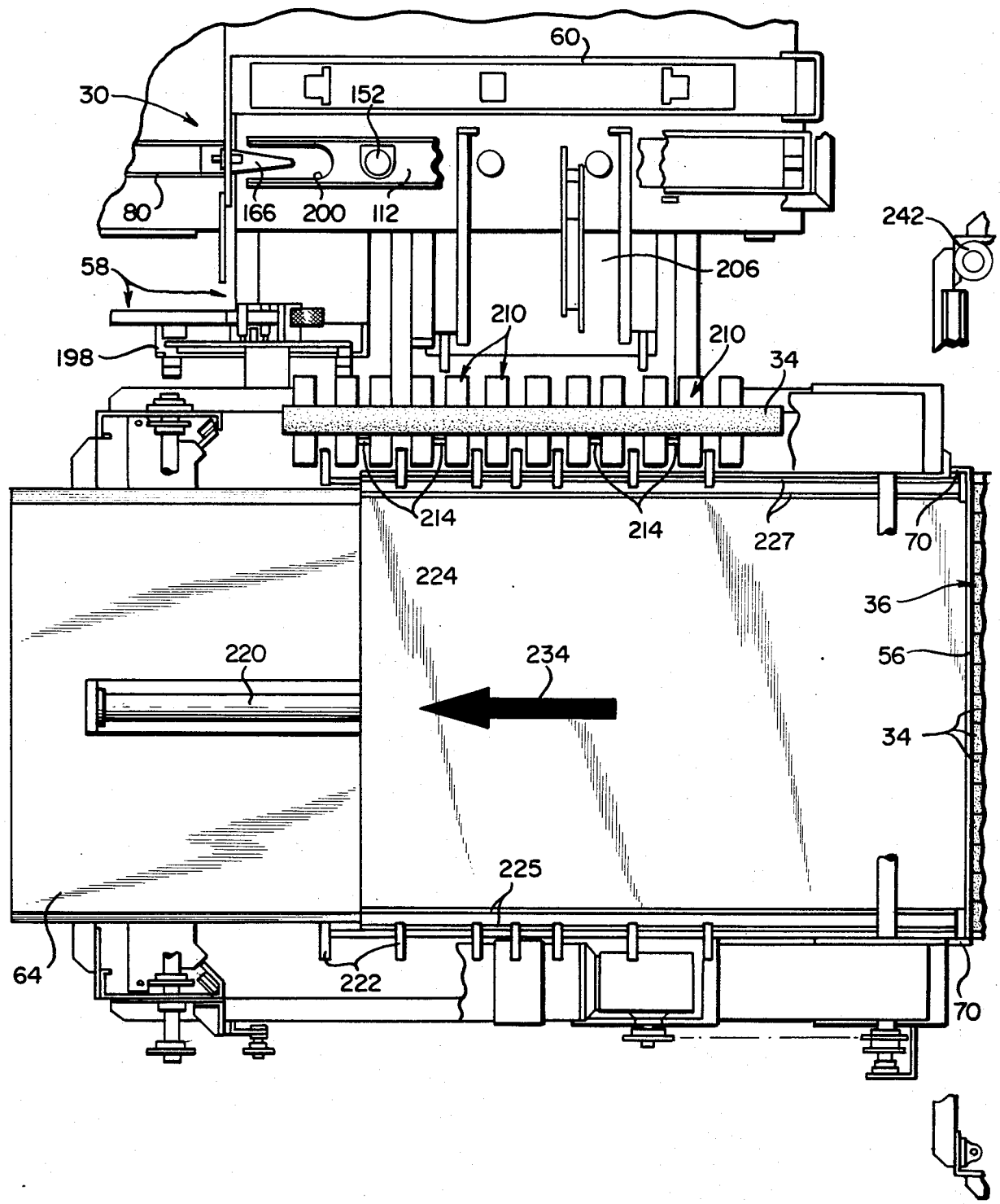
FIG. 15 is a top plan view of the collating station, and also illustrates the bagging station as well as the fold-and-tape station.

Attention is now directed to FIG. 15, which is a plan view of the apparatus in the condition as illustrated in FIG. 14, wherein the platen 62 is returning to its collating position. As can be seen, the fingers 214 associated with the ramp 210 are in an elevated position and have tempoarily retained a filled bag 34, while the collating apparatus 32 has been in motion. Once the platen 62 reaches the collating position, the fingers 214 are pivoted to their retracted position thereby releasing the filled bag 34 to roll down the ramp 210 onto the upper surface of the platen 62. Thus, loading of an additional layer of filled bags may commence immediately upon return of the platen to the collating position, or shortly thereafter. At this time, the overall control system for the machine 20 will adjust the position of fingers 222 such that the next layer 36 of filled bags to be received on the platen 62 will be offset with regard to the previously palletized layer of bags. It should be noted, that the palletizing off the bags 34 can extend to a height exceeding the normal collating position for the platen 62 and the support member 64, which condition is illustrated in FIG. 3. That is to say, the collating apparatus 32 may move vertically upward or downward to seek the appropriate level of the uppermost layer 36 of bags on the pallet 40 at the palletizing station 38.

Figure 16:
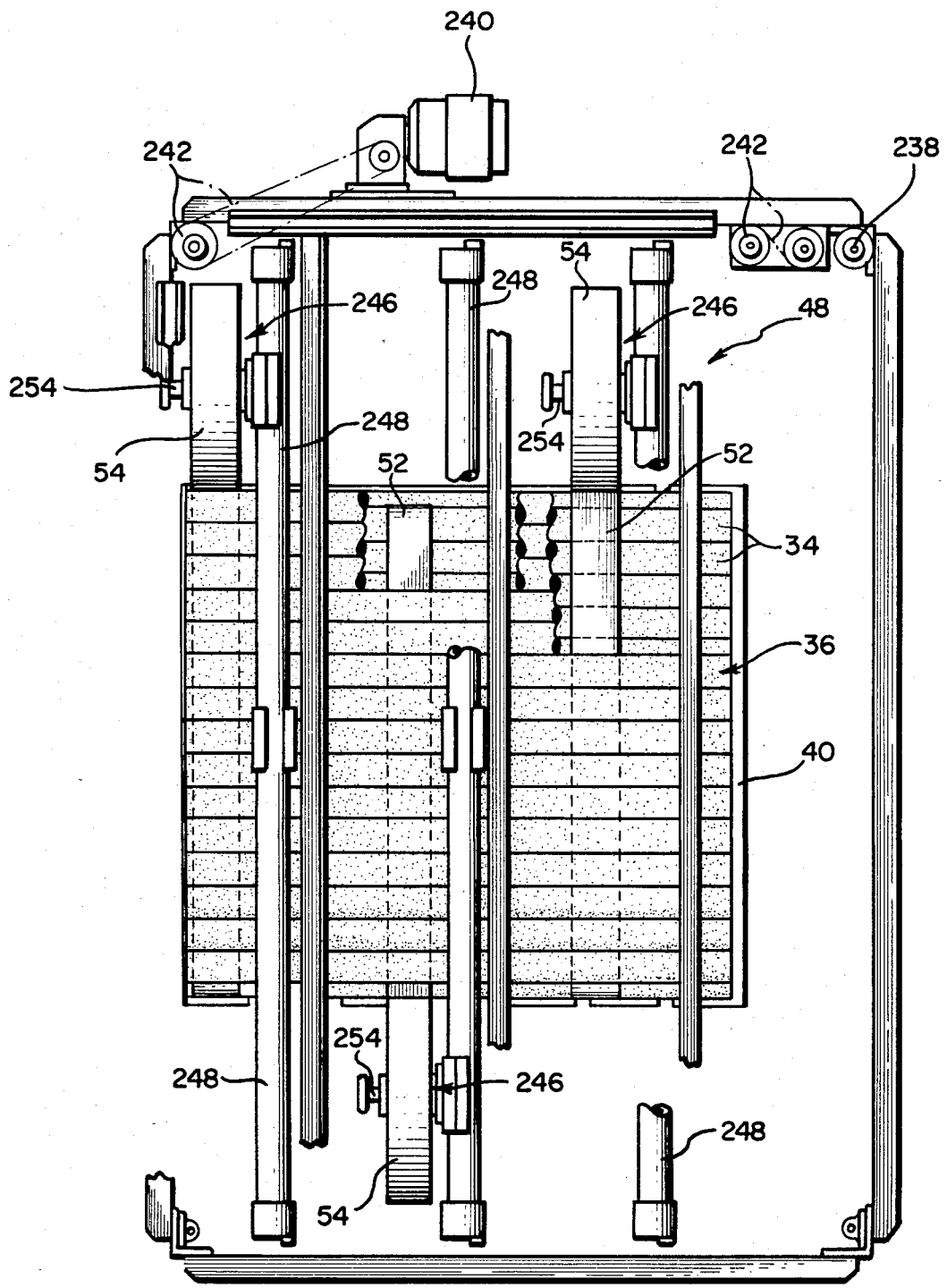
FIG. 16 is a top plan view of the palletizing station.

Consideration is now invited to the overall arrangement of the palletizing station 38 and primarily the tape dispensing means 48 associated therewith, as shown in FIGS. 3 and 16. In this regard, it should be recalled that FIG. 3 is an elevational view of the palletizing station 38 illustrating a plurality of layers 36 of filled bags having been stacked upon the pallet 40. FIG. 16, on the other hand, is a top plan view of said palletizing station 38.

The palletizing station 38 is defined by a frame structure 236 which includes means to support the rollers 50 upon which the pallet 40 is mounted, which rollers 50 facilitate removal of a filled pallet member 40. As can best be seen in FIG. 3, the frame 236 includes a plurality of vertically disposed drive screws 238 which are positioned at the respective corners off the frame and are operable to adjust the relative height of the tape dispensing means 48 which is mounted to said drive screws 238. In this regard, the vertical drive arrangement for the tape dispensing means 48 is provided by the aforementioned vertical drive screws 238, as well as by a motor 240, FIG. 16, which is coupled to the drive screws 238 by means of various pulleys, gears and a chain drive, all of which are conventional, and are designated generally 242. Thus, the tape dispensing means 48 may be adjusted vertically in accordance with the height of the layers 36 of filled bags disposed upon the pallet 40 before operation thereof.

With continued reference to FIG. 3, the overall construction of the tape dispensing means 48 will now be considered. In this regard, the tape dispensing means 48 includes a vertically moveable carriage or frame 244 which is operatively coupled to the drive screws 238. As such, operation of these drive screws 238 by motor 240 will result in adjustments in the vertical disposition of the frame 244 and correspondingly the tape dispensing means 48. Carried by the frame 244 are a plurality of tape dispensing units designated generally 246, each unit designed to accommodate a role of tape 54. In the preferred embodiment three such units 246 are employed, however, it is contemplated that interweaving of two strips of tape may be sufficient in some instances. Each of the tape dispensing units 246 is carried on an elongate horizontally disposed support member 248. Each said support member 248 includes a pair of opposed guides 250 and 252 upon which the tape dispensing unit 246 is mounted for horizontal, traversing movement relative to the aforementioned support 248. The method of obtaining this movement may vary, and in the preferred form of the invention a form of air drive (not shown) is employed. The tape dispensing units each 246 include a spindle 254 upon which the roll of tape 54 is mounted, and also a tape guide 255. Further a sensor 256 is carried by the vertically moveable carriage 244, which sensor detects the height of layers 36 on pallet 40 and controls movement of the carriage 244.

The tape support units 246 are probably best viewed in FIG. 16, where it can be seen how the arrangements are disposed for movement horizontally along the associated support members 248. In the illustrated form of the invention, three such tape dispensing units are employed with the intermediate unit 246 disposed to move oppositely to the companion units positioned proximate the edges of the layers 36 of palletized filled bags. As was discussed previously, this arrangement will interweave the strips of tape 52 so that the intermediate strip 52 is disposed oppositely that of the strips 52 proximate the edges of the palletized layers 36, with the strips of tape 52 serving to maintain the layers 36 in position during transport.

Consideration is now directed to the operation of the tape dispensing mechanism 48 in conjunction with the palletizing operation. In this regard, once a layer of filled bags 36 is deposited upon the palletizing station, the overall control mechanism will operate the drive motor 240 to adjust the carriage 244 to the proper vertical position that is in proximate vertical alignment with the recently deposited layer 36 of filled bags. Movement of the carriage 244 in this regard is controlled by the sensor 256. This will dispose the rolls of tape 54 somewhat above the uppermost layer 36. Next, the drive means for the tape dispensing units 246 are operated to cause the units 246 to move along or traverse the respective supports 248 thereby laying three strips of tape 52 across the top of the uppermost, recently deposited layer 36 and in effect binding this layer to the previously palletized layers of filled bags. This operation is repeated as the layers 36 of bags 34 build up, thereby interweaving the strips of tape 52 between the respective layers so that each layer is supported at approximately three separate locations against inadvertent depalletizing.

The aforegoing discussion of the apparatus 20 in conjunction with the drawings is believed to provide a full, complete and adequate disclosure of the various components of the machine 20 of the present invention. In conjunction therewith, the general overall operation of the machine will now be reviewed briefly. Initially, the individual can ends are delivered to the receiving station 22 of the machine 20 by means of the guide 84. The individual can ends 24 are accepted by a vacuum stacker 82 which will stack the ends in facewise engagement within the trough 80. The vacuum stacker 82 exerts a horizontal force on the stacked ends 24 as indicated by the arrow 86 forcing the ends toward the counter 90 and the rollers 88 associated therewith. In addition, the receiving station 22 includes a plenum chamber 92 wherein a gap in the stream of ends 24 moving in trough 80 is created so that the pivotal arm 98 of the separator mechanism 94 may be disposed within said gap once the desired count of ends is reached. The separator mechanism 94 is then traversed along the guide rod 100 in order to move the counted stack of ends 26 axially of the trough 80. The separator mechanism 94 is then retracted to assist in the separation of the next counted stack of ends 26 and the transport means 28 is engaged to force the previously counted stack 26 axially along the trough 80 to the bagging station 30.

At the bagging station 30, a bag 61 will have been removed from the bag magazine 60 and properly positioned for reception of the counted stack 26 of ends, as is generally illustrated in FIGS. 5 and 6. In this regard, the horn 166 is disposed within the clamped entry end of the bag 61, with the counted stack 26 is forced through the horn 166 into the bag, as shown in FIG. 6. Once the bag 61 has been filled, the filled bag, designated generally 34, is then transferred to the fold-and-tape station 58 wherein the entry end of the bag is folded over and a strip of tape applied to seal the bag. The sealed, filled bag 34 is then delivered to the collating station 32 and is disposed upon the upper surface of the platen 62 associated with said collating station.

The apparatus as thus described will continue to function, until the desired quantity of filled bags 34 are deposited upon the upper surface of the platen 62. In this regard, attention is invited to FIGS. 11 and 12 and the discussion which took place with respect to the operation of the arm members 222 and 224. More specifically, the arm members 224 will force the bags laterally across the upper surface of the platen 62 into engagement with the arms 222 which define the alternating offset arrangement for the bags 34 of the respective layers 36.

Once a complete layer 36 of bags is disposed upon the platen 62, the vertical drive means 42 for the platen support 64 is actuated and the sensor 230 will function in order to align the platen 62 with the uppermost layer 36 at the palletizing station 38. Once the platen is properly positioned, the cylinder 220, FIG. 15, is operated to cause the platen 62 to move horizontally relative to the platen support 64. The platen 62 and the layer 36 of bags thereon will move beneath the stripper bar 56 until the platen 62 is in overlying relationship with respect to the previously palletized layers of bags 36. When the platen reaches this position, the layer 36 disposed on the platen will have passed beneath the stripper bar 56 and the bar will pivot to the vertical position as shown in FIG. 14. Accordingly, upon subsequent withdrawal of the platen 62, the bar 56 will discharge the layer 36 from the platen 62 and deposit the layer upon the previously palletized layers 36 supported by the pallet member 40 at the palletizing station 38. Upon withdrawal of the platen 62 the overall control mechanism for machine 20 will operate the vertical drive 42 to return the collating apparatus 38, including the platen 62, to its proper collating position preparatory to the reception of further filled bags 34 which will make the next layer 36 to be palletized.

Upon retraction of the platen 62, the overall control mechanism will also commence operation of the tape dispensing arrangement 48. In this regard, the vertical drive for the tape carriage 244 is operated to adjust the position of the tape units 246 in relation to the uppermost layer 36 of palletized bags, the sensor means 256 being used to control the relative vertical position of the carriage 244. Once the tape dispensing units 246 are properly positioned, the horizontal drive mechanism for the respective units are operated to cause the units to move horizontally of the guide member 238. This movement of the tape dispensing arrangements 246 will playoff strips of tape 52 and lay the strips across the top of the recently deposited layer 36 as the machine continues to operate the strips of tape 52 are interwoven between the respective layers 36 as these layers are built up at the palletizing station.

Once the desired level of layers is reached, operation of the machine is interrupted, and the pallet 40 with the layers 36 of filled bags 34 thereon is removed and a new pallet 40 is placed in position. Preparatory to the commencement of palletizing of filled bags, the strip of tape 52 is fastened to the pallet 40 as illustrated in the drawings, and operation of the machine can then resume. The machine 20 thus will automatically count a stack of can ends, dispose a stack of counted ends within a bag, seal the entry end of the bag, and thereafter collate and palletize layers of filled bags while automatically interweaving strips of tape between the respective layers; all of which is accomplished without manual handling of the ends, the folded bag members, or the individual filled bags 34.

The control arrangement for the machine 20 includes state of the art microprocessing and is important in that the sequence of operation may be adjusted in relation to the size of the can end and the number of ends to be disposed within each bag member. The specific details of the control arrangement are not deemed critical or necessary to an understanding of the machine 20 of the present invention nor its method of operation, as those skilled in the art could devise numerous control systems for attaining the desired mode of operation. Therefore only such details as are necessary to a full and complete understanding of the invention have been included herein.

Further, while a preferred embodiment of the invention has been illustrated and described, it is to be understood that those skilled in the art may devise certain variations, modifications and/or substitution of the specific components as illustrated and disclosed, without departing from the spirit and scope of the invention, as defined by the claims appended hereto.

The invention is claim as follows:

1. Apparatus for handling and bagging articles, such as can ends, to provide elongate filled bags and thereafter depositing said filled bags on a pallet member in such a manner as to provide one or more layers of filled, palletized bags, said apparatus including: receiving station means for providing individual stacks of articles disposed in facewise relationship; transport means for delivery of a stack of articles from said receiving station; bagging station means for receiving a stack of articles from said receiving station, and including means for disposing said stack of articles within a bag to provide an elongate filled bag; collating station means for receiving and temporarily storing a predetermined number of filled bags received from said bagging station, said collating station means including a platen member normally offset from the pallet member with said filled bags being disposed in generally side-by-side horizontal disposition on said platen member prior to palletizing such that the said predetermined number of filled bags will define a layer of palletized bags once deposited on a pallet member, said collating station further including support means for said platen providing for movement thereof in both the horizontal and vertical directions, such that said platen may first be moved vertically to position the elongate filled bags thereon with respect to the layers on the pallet member, and said platen then moved horizontally into overlying relationship with respect to the pallet member; and discharge means for discharging a layer of filled bags from said platen member upon movement from said overlying position with respect to the pallet member to an offset position; and palletizing station means including means for receiving a pallet member preparatory to the disposition of one or more layers of filled bags on said pallet member by said collating station means.

2. Apparatus according to claim 1, wherein said receiving station means includes means for handling a continuous stream of articles and for counting the number of articles and for counting the number of articles in each said stack, thereby providing stacks of articles of substantially a uniform, predetermined count for delivery to the bagging station.

3. Apparatus according to claim 1, wherein said bagging station means includes bag handling means for opening and positioning an open bag for disposition of a stack of articles therein upon movement of said stack of articles to the bagging station by said transport means.

4. Apparatus according to claim 1, wherein said bagging station means includes means for closing the bag by folding over the open end of the bag, and tape applying means for sealing said folded over end in the closed position.

5. Apparatus according to claim 1, wherein said discharge means comprises a stripper bar member carried by said support means for the platen and disposed transversely to said platen in proximate overlying relation to the upper surface of said platen upon which said layer of filled bags are disposed, said stripper bar member being mounted so that it may pivot upwardly when said platen moves from the initial filled bag receiving position into overlying relationship with said palletizing station, with the layer of filled bags thereon passing under said stripper bar member, said stripper bar member returning to its vertical position and being disposed behind said layer of filled bags upon said platen being disposed in overlying relationship to said palletizing station, such that upon retractive movement of said platen said stripper bar will engage the layer of filled bags on said platen and will effect discharge of said layer onto the palletizing station.

6. Apparatus according to claim 1, wherein said apparatus further includes first drive means for effecting vertical movement of said support means and the platen supported thereon, and second drive means for effecting the horizontal movement of said platen relative to said support means; and sensing means associated with said first drive means for properly positioning the platen with respect to the palletizing station prior to effecting discharge of the layer of bags supported on said platen.

7. Apparatus according to claim 1, wherein said filled bags are substantially circular in section and said apparatus further includes positioning means for stacking respective layers of palletized bags in offset relation to adjacent layers.

8. Apparatus according to claim 7, wherein said positioning means includes relatively moveable abutment means associated with said collating station means, said abutment means being positioned adjacent the edge of said platen remote from that at which filled bags are initially received advancing means for moving filled bags across the upper surface of said platen into engagement with said abutment means, said abutment means being moveable between a first position and a second position to vary the orientation of the bags of each layer disposed on said platen in preparation to delivery of said filled bags to the palletizing station, so that the respective layers of filled bags will be offset when palletized.

9. Apparatus according to claim 8, wherein said abutment means comprises one or more pivotally mounted members and a difference between said first position and said second position being approximately equal to the radius of said filled bags.

10. Apparatus according to claim 8, wherein said advancing means for the filled bags includes one or more pivotally mounted members positioned adjacent the edge of said platen at which the filled bags are received, said advancing means being operable to engage a filled bag upon initial disposition onto said platen, and to move said bag and all previously received filled bags on the platen laterally across the upper surface thereof toward the abutment means, until the initially received filled bags of the layer engages said abutment means to define the relative position of the bags for the layer being stored on said platen prior to palletizing.

11. Apparatus according to claim 1, wherein said palletizing station means includes tape dispensing means for interweaving at least one strip of tape between the respective layers of filled bags palletized on said pallet member, said tape assisting in maintaining the respective layer of bags in stacked, palletized relationship during subsequent transport.

12. Apparatus according to claim 1, further including transfer means for moving a filled bag from the bagging station means to the collating station means, said transfer means including a tray upon which the filled bag is positioned at said bagging station, means for moving said tray toward said collating station, and means for pivoting said tray to discharge a filled bag for delivery to said collating station means.

13. Apparatus according to claim 12, further including bag sealing means disposed intermediate said bagging station means and said collating station means, said bag sealing means including means for folding over the open end of a filled bag, and tape applying means for sealing said folded over end in the bag closed position.

14. Apparatus according to claim 12, wherein said transfer means further includes a ramp surface receiving said filled bag from said tray for delivery to said collating station means, selectively operable filled bag retarding means associated with said ramp, such that when said collating station means is operating to discharge a layer of filled bags onto the palletizing station, said filled bag retarding means will retain the filled bags until the collating station means is in condition to begin to accept another layer of filled bags.

15. Apparatus according to claim 1, further including selectively operable filled bag retarding means disposed intermediate said bagging station means and said collating station means, such that when said collating station means is operating to discharge a layer of filled bags onto the palletizing station, said filled bag retarding means will retain the filled bags until the collating station means is returned to its initial condition to begin to accept an additional layer of filled bags.

16. Apparatus according to claim 1, wherein said filled bags are substantially circular in cross-section, and said apparatus further includes positioning means for stacking the respective layers of palletized bags in offset relationship to the adjacent layers.

17. Apparatus for handling and bagging articles, such as can ends, and thereafter depositing filled bags of said article on a pallet member in such a manner as to provide one or more layers of filled, palletized bags, said apparatus including: receiving station means for providing individual stacks of articles disposed in facewise relationship; transport means for delivery of a stack of articles from said receiving station; bagging station means for receiving a stack of articles from said receiving station, and including means for disposing said stack of articles within a bag to provide a filled bag; collating station means for receiving and temporarily storing a predetermined number of filled bags received from said bagging station, with said filled bags being disposed in generally side-by-side horizontal disposition prior to palletizing such that the said predetermined number of filled bags will define a layer of palletized bags once deposited on a pallet member, and discharge means for discharging a layer of filled bags from said collating station means; palletizing station means including means for receiving a pallet member preparatory to the disposition of one or more layers of filled bags on said pallet member by said collating station means; and said bagging station including means for maintaining a bag in position with the mouth of the bag open preparatory to reception of a stack of articles, said means including horn means for insertion into the open mouth of said bag, said horn means comprising an annular base member and a nose portion defined by a plurality of pivotally mounted fingers biased into engagement to provide said nose portion with a conical configuration, cam means on each said finger, said horn being moveable between a retracted position and an inserted position wherein the nose portion is disposed within the mouth of a bag, with movement to said inserted position causing said cam means to be engaged to spread said fingers, whereby a stack of articles can move through said annular base member and said spread fingers into a bag member.

18. Apparatus for handling and bagging articles, such as can ends, and thereafter depositing filled bags of said article on a pallet member in such a manner as to provide one or more layers of filled, palletized bags, said apparatus including: receiving station means for providing individual stacks of articles disposed in facewise relationship; transport means for delivery of a stack of articles from said receiving station; bagging station means for receiving a stack of articles from said receiving station, and including means for disposing said stack of articles within a bag to provide a filled bag; collating station means for receiving and temporarily storing a predetermined number of filled bags received from said bagging station, with said filled bags being disposed in generally side-by-side horizontal disposition prior to palletizing such that the said predetermined number of filled bags will define a layer of palletized bags once deposited on a pallet member, and discharge means for discharging a layer of filled bags from said collating station means; palletizing station means including means for receiving a pallet member preparatory to the disposition of one or more layers of filled bags on said pallet member by said collating station means; and said palletizing station means further including tape dispensing means for interweaving a plurality of strips of tape between the respective layers of filled bags disposed on said pallet member to maintain the respective layers in palletized relationship during subsequent transport, said tape dispensing means comprising at least two tape support units upon which rolls of tape may be mounted; drive means for said tape support units for moving said support units transversely and horizontally of the palletizing station, the respective tape support units arranged to move oppositely of each other thereby to interweave at least two strips of tape between respective layers of filled bags, but with the strips of tape disposed in opposite alternating orientation with respect to each said layer.

19. Apparatus according to claim 18, further including vertically moveable carriage means upon which said tape support units and said drive means for said tape support units are mounted, a drive arrangement for said carriage means including sensing means for detecting the level of the layers of filled bags on the palletizing station, whereby said carriage means can be moved vertically to position the tape support means with respect to the uppermost layer of filled bags preparatory to operation of said tape dispensing means.

20. Palletizing apparatus for depositing elongate filled bags, or the like, on a pallet member said apparatus comprising: collating station means for receiving and temporarily storing a prescribed number of filled bags in side-by-side relationship in preparation for palletizing, which number of filled bags will define a layer of palletized bags once disposed on a pallet member; palletizing station means including, means for receiving a pallet member whereby a layer of filled bags can be transferred from said collating station means to said pallet member; said collating station means comprising a platen member upon which said filled bags in side-by-side relationship are received, which platen is disposed laterally of the palletizing station during receipt of filled bags, support means for said platen member including first drive means for moving said platen in the vertical direction, and second drive means for moving said platen horizontally and laterally, said platen being moveable initially vertically by the first drive means from a filled bag receiving position to a first position in relation to the level of bags at said palletizing station, and then said platen being movable horizontally by said second drive means to a discharge position in overlying relationship with respect to said palletizing station; and discharge means for removing a layer of filled bags from said platen and depositing said layer onto said palletizing station upon subsequent movement of said platen by said second drive means from said overlying discharge position.

21. Apparatus aaccording to claim 20, wherein said discharge means comprises a stripper bar member carried by said support means for the platen and disposed transversely to said platen in proximate overlying relation to the upper surface of said platen upon which said layer of filled bags are disposed, said stripper bar member being mounted so that it may pivot upwardly when said platen moves from the initial filled bag receiving position into overlying relationship with said palletizing station, with the layer of filled bags thereon passing under said stripper bar member, said stripper bar member returning to its vertical position and being disposed behind said layer of filled bags upon said platen being disposed in overlying relationship to said palletizing station, such that upon retractive movement of said platen said stripper bar will engage the layer of filled bags on said platen and will effect discharge of said layer onto the palletizing station.

22. Apparatus according to claim 20, further including sensing means associated with said first drive means for properly positioning the platen with respect to previously palletized layers of filled bags at the palletizing station prior to effecting discharge of the layer of bags supported on said platen.

23. Apparatus according to claim 20, wherein said filled bags are substantially circular in section and said apparatus further includes positioning means for stacking the respective layers of palletized bags in offset relation to the adjacent layers.

24. Apparatus according to claim 23, wherein said positioning means includes relatively moveable abutment means associated with said collating station means, said abutment means being positioned adjacent the edge of said platen remote from that at which filled bags are initially received; advancing means for moving filled bags across the upper surface of said platen into engagement with said abutment means, said abutment means being moveable between a first position and a second position to vary the orientation of the bags of each layer dispoed on said platen in preparation to delivery of said filled bags to the palletizing station, so that the respective layers of filled bags will be offset when palletized.

25. Apparatus according to claim 24, wherein said abutment means comprises one or more pivotally mounted members and a difference between said first position and said second position being approximately equal to the radius of said filled bags.

26. Apparatus according to claim 24, wherein said advancing means for the filled bags includes one or more pivotally mounted members positioned adjacent the edge of said platen at which the filled bags are received, said advancing means being operable to engage a filled bag upon initial disposition onto said platen, and to move said bag and all previously received filled bags on the platen laterally across the upper surface thereof toward the abutment means, until the initially received filled bags of the layer engages said abutment means to define the relative position of the bags for the layer being stored on said platen prior to palletizing.

27. Apparatus according to claim 20, further including selectively operable filled bag retarding means disposed adjacent said collating station, such that when said collating station is operating to discharge a layer of filled bags onto the palletizing station, said filled bag retarding means will retain the filled bags until the collating station means is in condition to begin to accept an additional layer of filled bags.

28. Palletizing apparatus for handling bagged articles, such as can ends, disposed on a pallet member in such a manner as to provide a plurality of layers of filled, palletized bags, said apparatus including: a palletizing station for receiving a pallet member preparatory to the disposition of one or more layers of filled bags on said pallet member, said palletizing station including tape dispensing means for interweaving strips of tape between the respective layers of filled bags palletized on said pallet member, said tape assisting in maintaining the respective layer of bags in stacked, palletized relationship during subsequent transport, said tape dispensing means comprising at least two tape support means for a roll of tape material; drive means for said tape support means for moving said tape support means transversely and horizontally of the pallet member, the respective tape support means arranged to move oppositely of each other thereby to interweave at least two strips of tape between respective layers of filled bags, but with the strips of tape disposed in opposite alternating orientation with respect to each said layer.

29. Apparatus according to claim 28, further including vertically moveable carriage means upon which said tape support means and said drive means for said tape support means are mounted, a vertical drive arrangement for said carriage means including sensing means for detecting the level of the layers of filled bags on the pallet member, whereby said carriage means can be moved vertically to position the tape support means with respect to the uppermost layer of filled bags preparatory to operation of said tape dispensing means.

30. Apparatus according to claim 28, wherein three tape support means are provided, with two said tape support means disposed proximate the edges of the pallet member, and with the third tape support means disposed intermediate the first two, and said third tape support means moving oppositely of said first two tape support means.

31. A method for handling a plurality of bagged articles, such as can ends, and depositing a plurality of bags filled with said articles on a pallet member, said method comprising the steps of; depositing a plurality of filled bags on a moveable platen member, or the like; positioning said platen member in overlying relation to said pallet member; depositing all of said plurality of bags onto the pallet member as a group by moving said platen relative to said pallet member while restraining movement of said layer of filled bags, wherein said plurality of bags will define a layer of palletized bags; repeating the steps of, depositing bags on the platen member, positioning the platen over the pallet member, and depositing a layer of bags onto the pallet member to build up a plurality of layers of filled bags, and said method further including the step of interweaving at least two continuous strips of tape between the layers, the strips of tape being disposed oppositely to maintain the layers in position during transport, said step including, disposing sections of said strips on top of each layer of bags after disposition onto the pallet member.

32. A method according to claim 31, wherein said method further includes the step of offsetting the bags of a given layer with respect to the previously palletized layer upon positioning of said bags on the platen member, such that when palletized each layer will be offset with respect to the adjacent layers and the bags will rest within the troughs provided by the bags of the adjacent layers.

33. A method according to claim 31, wherein the step of restraining movement of the filled bags include the step of engaging the bags with a stripper bar that is held stationary with respect to the platen upon movement of the platen relative to said pallet.

34. A method according to claim 31, wherein the step of positioning the platen includes the steps of; initially disposing the platen laterally of the pallet member during depositing of the filled bags thereon; and after a predetermined number of bags are so positioned thereon, moving said platen horizontally into overlying relation with respect to said pallet member.

35. A method according to claim 34, further including the steps of; providing a stripper bar disposed above said platen and stationary with respect to the horizontal movement of said platen; permitting said platen and the layer of bags thereon to move under said stripper bar upon movement of the platen into overlying relation with the pallet member and thereafter engaging the layer of bags with said stripper bar to effect said restraining of movement of said layer of filled bags upon movement of the platen to deposit the layer of bags on the pallet member.

* * * * *